US012700212B2

(12) United States Patent
Zhang et al.

(10) Patent No.: US 12,700,212 B2
(45) Date of Patent: Aug. 4, 2026

(54) GENERATING COLOR-EDITED DIGITAL IMAGES UTILIZING A CONTENT AWARE DIFFUSION NEURAL NETWORK

(71) Applicant: Adobe Inc., San Jose, CA (US)

(72) Inventors: Zhifei Zhang, San Jose, CA (US); Zhe Lin, Fremont, CA (US); Yixuan Ren, San Jose, CA (US); Yifei Fan, Santa Clara, CA (US); Jing Shi, Rochester, NY (US)

(73) Assignee: Adobe Inc., San Jose, CA (US)

( * ) Notice: Subject to any disclaimer, the term of this patent is extended or adjusted under 35 U.S.C. 154(b) by 438 days.

(21) Appl. No.: 18/363,980

(22) Filed: Aug. 2, 2023

(65) Prior Publication Data

US 2025/0046055 A1      Feb. 6, 2025

(51) Int. Cl.
| | |
|---|---|
| *G06V 10/56* | (2022.01) |
| *G06T 5/70* | (2024.01) |
| *G06V 10/60* | (2022.01) |
| *G06V 10/82* | (2022.01) |

(52) U.S. Cl.
CPC ................ *G06V 10/56* (2022.01); *G06T 5/70* (2024.01); *G06V 10/60* (2022.01); *G06V 10/82* (2022.01); *G06T 2207/10024* (2013.01)

(58) Field of Classification Search
CPC ........ G06V 10/56; G06V 10/60; G06V 10/82; G06T 5/70; G06T 2207/10024; G06T 2207/20081; G06T 2207/20084; G06T 5/60
See application file for complete search history.

(56) References Cited

U.S. PATENT DOCUMENTS

| | | | |
|---|---|---|---|
| 2022/0301227 A1* | 9/2022 | Kanazawa .............. | G06T 7/194 |
| 2025/0117978 A1* | 4/2025 | Chugh .................. | G06T 11/001 |
| 2025/0218076 A1* | 7/2025 | Akula ..................... | G06T 11/60 |
| 2025/0328987 A1* | 10/2025 | Ren ...................... | G06V 10/771 |
| 2025/0356540 A1* | 11/2025 | Djelouah ............. | G06V 10/774 |

OTHER PUBLICATIONS

Liu, Hanyuan, et al. "Video colorization with pre-trained text-to-image diffusion models." arXiv preprint arXiv:2306.01732 (Jun. 2023). (Year: 2023).*

(Continued)

*Primary Examiner* — Andrae S Allison
(74) *Attorney, Agent, or Firm* — Keller Preece PLLC

(57) ABSTRACT

This disclosure describes one or more implementations of systems, non-transitory computer-readable media, and methods that trains (and utilizes) an image color editing diffusion neural network to generate a color edited digital image(s) for a digital image. In particular, in one or more implementations, the disclosed systems identify a digital image depicting content in a first color style. Moreover, the disclosed systems generate, from the digital image utilizing an image color editing diffusion neural network, a color-edited digital image depicting the content in a second color style different from the first color style. Further, the disclosed systems provide, for display within a graphical user interface, the color-edited digital image.

20 Claims, 12 Drawing Sheets

100

(56) References Cited

OTHER PUBLICATIONS

Zhang, Yuxin, et al. "Inversion-based style transfer with diffusion models." Proceedings of the IEEE/CVF conference on computer vision and pattern recognition. 2023. (Year: 2023).*

Valevski, Dani, et al. "Unitune: Text-driven image editing by fine tuning a diffusion model on a single image." ACM Transactions on Graphics (TOG) 42.4 (2023): 1-10. (Year: 2023).*

Ma et al, Semantic-related image style transfer with dual-consistency loss, Neurocomputing 406 (2020) 135-149 (Year: 2020).*

Aditya Ramesh, Prafulla Dhariwal, Alex Nichol, Casey Chu, and Mark Chen. Hierarchical text-conditional image generation with clip latents. arXiv preprint arXiv:2204.06125, 2022.

Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. Learning transferable visual models from natural language supervision. In International conference on machine learning, pp. 8748-8763. PMLR, 2021.

Alex Nichol, Prafulla Dhariwal, Aditya Ramesh, Pranav Shyam, Pamela Mishkin, Bob McGrew, Ilya Sutskever, and Mark Chen. Glide: Towards photorealistic image generation and editing with text-guided diffusion models. arXiv preprint arXiv:2112.10741, 2021.

Bahjat Kawar, Michael Elad, Stefano Ermon, and Jiaming Song. Denoising diffusion restoration models. arXiv preprint arXiv:2201.11793, 2022.

Chen Henry Wu and Fernando De la Torre. Unifying diffusion models' latent space, with applications to cycle diffusion and guidance. arXiv preprint arXiv:2210.05559, 2022.

Chitwan Saharia, Jonathan Ho, William Chan, Tim Salimans, David J Fleet, and Mohammad Norouzi. Image super-resolution via iterative refinement. IEEE Transactions on Pattern Analysis and Machine Intelligence, 2022.

Chitwan Saharia, William Chan, Huiwen Chang, Chris Lee, Jonathan Ho, Tim Salimans, David Fleet, and Mohammad Norouzi. Palette: Image-to-image diffusion models. In ACM SIGGRAPH 2022 Conference Proceedings, pp. 1-10, 2022.

Chitwan Saharia, William Chan, Saurabh Saxena, Lala Li, Jay Whang, Emily Denton, Seyed Kamyar Seyed Ghasemipour, Burcu Karagol Ayan, S Sara Mahdavi, Rapha Gontijo Lopes, et al. Photorealistic text-to-image diffusion models with deep language understanding. arXiv preprint arXiv:2205.11487, 2022.

Elad Richardson, Yuval Alaluf, Or Patashnik, Yotam Nitzan, Yaniv Azar, Stav Shapiro, and Daniel Cohen-Or. Encoding in style: a stylegan encoder for image-to-image translation. In Proceedings of the IEEE/CVF conference on computer vision and pattern recognition, pp. 2287-2296, 2021.

Han-Ul Kim, Young Jun Koh, and Chang-Su Kim. Pienet: Personalized image enhancement network. In European Conference on Computer Vision, pp. 374-390. Springer, 2020.

Hsin-Ying Lee, Hung-Yu Tseng, Jia-Bin Huang, Maneesh Singh, and Ming-Hsuan Yang. Diverse image-to-image translation via disentangled representations. In Proceedings of the European conference on computer vision (ECCV), pp. 35-51, 2018.

Hsin-Ying Lee, Hung-Yu Tseng, Qi Mao, Jia-Bin Huang, Yu-Ding Lu, Maneesh Singh, and Ming-Hsuan Yang. Drit++: Diverse image-to-image translation via disentangled representations. International Journal of Computer Vision, 128(10):2402-2417, 2020.

Ian Goodfellow, Jean Pouget-Abadie, Mehdi Mirza, Bing Xu, David Warde-Farley, Sherjil Ozair, Aaron Courville, and Yoshua Bengio. Generative adversarial networks. Communications of the ACM, 63(11):139-144, 2020.

Jascha Sohl-Dickstein, Eric Weiss, Niru Maheswaranathan, and Surya Ganguli. Deep unsupervised learning using nonequilibrium thermodynamics. In International Conference on Machine Learning, pp. 2256-2265. PMLR, 2015.

Jiaming Song, Chenlin Meng, and Stefano Ermon. Denoising diffusion implicit models. arXiv preprint arXiv:2010.02502, 2020.

Jie Liang, Hui Zeng, Miaomiao Cui, Xuansong Xie, and Lei Zhang. Ppr10k: A large-scale portrait photo retouching dataset with human-region mask and group-level consistency. In Proceedings of the IEEE/CVF Conference on Computer Vision and Pattern Recognition, pp. 653-661, 2021.

Jing Shi, Ning Xu, Haitian Zheng, Alex Smith, Jiebo Luo, and Chenliang Xu. Spaceedit: learning a unified editing space for open-domain image editing. In IEEE/CVF Conference on Computer Vision and Pattern Recognition, 2022.

Jingwen He, Yihao Liu, Yu Qiao, and Chao Dong. Conditional sequential modulation for efficient global image re-touching. In European Conference on Computer Vision, pp. 679-695. Springer, 2020.

Joe Maller. Rgb and yuv color. FXScript Reference, 2003.

Jonathan Ho and Tim Salimans. Classifier-free diffusion guidance. arXiv preprint arXiv:2207.12598, 2022.

Jonathan Ho, Ajay Jain, and Pieter Abbeel. Denoising diffusion probabilistic models. Advances in Neural Information Processing Systems, 33:6840-6851, 2020.

Jooyoung Choi, Sungwon Kim, Yonghyun Jeong, Youngjune Gwon, and Sungroh Yoon. Ilvr: Conditioning method for denoising diffusion probabilistic models. arXiv preprint arXiv:2108.02938, 2021.

Julia Wolleb, Robin Sandkuhler, Florentin Bieder, and Philippe C Cattin. The swiss army knife for image-to-image translation: Multitask diffusion models. arXiv preprint arXiv:2204.02641, 2022.

Jun-Yan Zhu, Richard Zhang, Deepak Pathak, Trevor Darrell, Alexei A Efros, Oliver Wang, and Eli Shechtman. Toward multimodal image-to-image translation. Advances in neural information processing systems, 30, 2017.

Katherine Crowson. Clip Guided diffusion hq 256x256.ipynb. <Http://colab.research.google.com/drive/1IQJXS55mRyN7TWDomTNo8tbeUErO7rMJ>, 2021.

Martin Heusel, Hubert Ramsauer, Thomas Unterthiner, Bernhard Nessler, and Sepp Hochreiter. Gans trained by a two time-scale update rule converge to a local nash equilibrium. Advances in neural information processing systems, 30, 2017.

Matthias Wright and Björn Ommer. Artfid: Quantitative Evaluation of Neural Style Transfer, Computer Vision and Pattern Recognition. arXiv:2207.12280v1, pp. 1-17, Jul. 25, 2022.

Olaf Ronneberger, Philipp Fischer, and Thomas Brox. U-net: Convolutional networks for biomedical image segmentation. In International Conference on Medical image computing and computer-assisted intervention, pp. 234-241. Springer, 2015.

Omer Tov, Yuval Alaluf, Yotam Nitzan, Or Patashnik, and Daniel Cohen-Or. Designing an encoder for stylegan image manipulation. ACM Transactions on Graphics (TOG), 40(4):1-14, 2021.

Prafulla Dhariwal and Alexander Nichol. Diffusion models beat gans on image synthesis. Advances in Neural Information Processing Systems, 34:8780-8794, 2021.

Richard Zhang, Phillip Isola, Alexei A Efros, Eli Shecht-man, and Oliver Wang. The unreasonable effectiveness of deep features as a perceptual metric. In Proceedings of the IEEE conference on computer vision and pattern recognition, pp. 586-595, 2018.

Robin Rombach, Andreas Blattmann, Dominik Lorenz, Patrick Esser, and Bjorn Ommer. High-resolution image synthesis with latent diffusion models. In Proceedings of the IEEE/CVF Conference on Computer Vision and Pattern Recognition, pp. 10684-10695, 2022.

Rui Liu, Yixiao Ge, Ching Lam Choi, Xiaogang Wang, and Hongsheng Li. Divco: Diverse conditional image synthesis via contrastive generative adversarial network. In Proceedings of the IEEE/CVF Conference on Computer Vision and Pattern Recognition, pp. 16377-16386, 2021.

Sanghyeon Na, Seungjoo Yoo, and Jaegul Choo. Miso: Mutual information loss with stochastic style representations for multimodal image-to-image translation. arXiv preprint arXiv:1902.03938, 2019.

Shengyu Zhao, Jonathan Cui, Yilun Sheng, Yue Dong, Xiao Liang, Eric I Chang, and Yan Xu. Large scale image completion via co-modulated generative adversarial networks. arXiv preprint arXiv:2103.10428, 2021.

Tero Karras, Samuli Laine, and Timo Aila. A style-based generator architecture for generative adversarial networks. In Proceedings of the IEEE/CVF conference on computer vision and pattern recognition, pp. 4401-4410, 2019.

(56) References Cited

OTHER PUBLICATIONS

Tero Karras, Samuli Laine, Miika Aittala, Janne Hellsten, Jaakko Lehtinen, and Timo Aila. Analyzing and improving the image quality of stylegan. In *Proceedings of the IEEE/CVF conference on computer vision and pattern recognition*, pp. 8110-8119, 2020.

Xuan Su, Jiaming Song, Chenlin Meng, and Stefano Ermon. Dual diffusion implicit bridges for image-to-image translation. arXiv preprint arXiv:2203.08382, 2022.

Xun Huang, Ming-Yu Liu, Serge Belongie, and Jan Kautz. Multimodal unsupervised image-to-image translation. In *Proceedings of the European conference on computer vision (ECCV)*, pp. 172-189, 2018.

Yuda Song, Hui Qian, and Xin Du. Starenhancer: Learning real-time and style-aware image enhancement. In Proceedings of the IEEE/CVF International Conference on Computer Vision, pp. 4126-4135, 2021.

Yujun Shen and Bolei Zhou. Closed-form factorization of latent semantics in gans. In *Proceedings of the IEEE/CVF conference on computer vision and pattern recognition*, pp. 1532-1540, 2021.

* cited by examiner

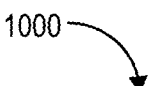
1000
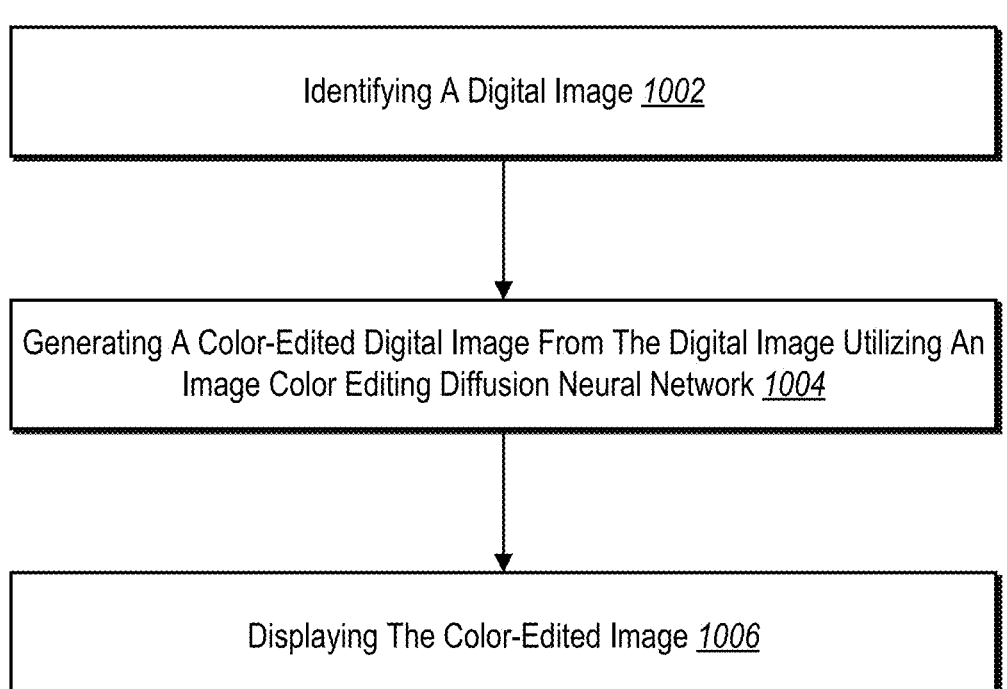
Identifying A Digital Image *1002*
Generating A Color-Edited Digital Image From The Digital Image Utilizing An Image Color Editing Diffusion Neural Network *1004*
Displaying The Color-Edited Image *1006*
*Fig. 10*

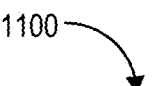

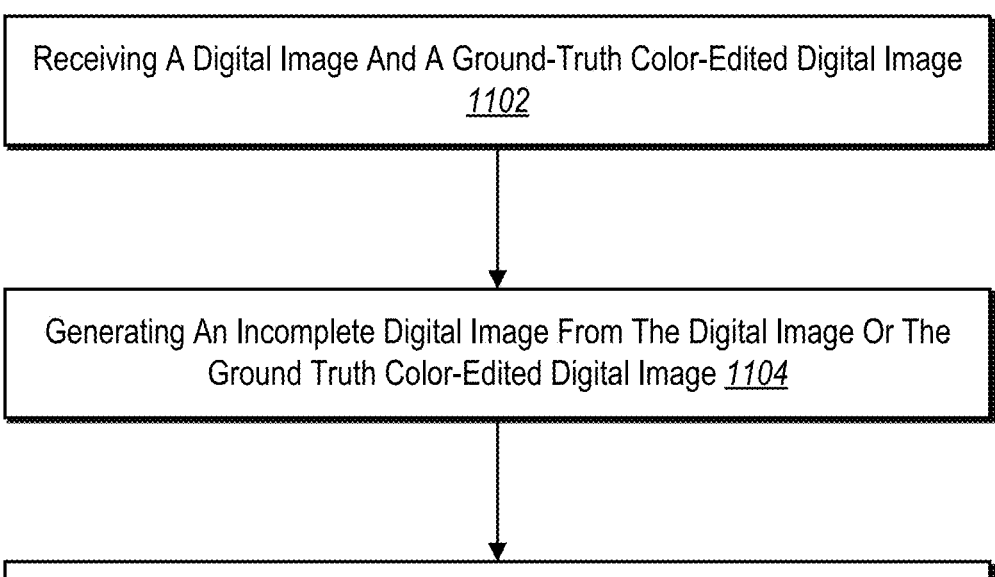

Receiving A Digital Image And A Ground-Truth Color-Edited Digital Image _1102_

Generating An Incomplete Digital Image From The Digital Image Or The Ground Truth Color-Edited Digital Image _1104_

Training An Image Color Editing Diffusion Neural Network To Generate Color-Edited Digital Images Utilizing The Digital Image, The Ground-Truth Color-Edited Digital Image, And The Incomplete Digital Image _1106_

*Fig. 11*

GENERATING COLOR-EDITED DIGITAL IMAGES UTILIZING A CONTENT AWARE DIFFUSION NEURAL NETWORK

BACKGROUND

Recent years have seen significant improvement in hardware and software platforms for creating and modifying digital content. For example, computer systems increasingly utilize computing devices and machine learning platforms to create and modify digital content, such as digital images. In many instances, in this field of art, computing systems utilize image editing applications that include generative adversarial networks to modify visual attributes and content of digital images. Despite these advances, such systems suffer from a number of technical deficiencies in relation to accuracy and operational flexibility of implementing computing devices.

SUMMARY

This disclosure describes one or more implementations of systems, non-transitory computer readable media, and methods that solve one or more of the following problems by training (and utilizing) an image color editing diffusion neural network to generate a color edited digital image(s) for a digital image. In one or more embodiments, the disclosed systems train and utilize an image color editing diffusion neural network for diversified image color editing to achieve realistic, content aware color. For instance, the disclosed systems train an image color editing diffusion neural network to generate one or more color-edited versions of a digital image by denoising noise representations conditioned on an unedited version of the digital image. Furthermore, in one or more embodiments, the disclosed systems jointly train the image color editing diffusion model for color space restoration tasks to enhance the content awareness of the image color editing diffusion neural network.

BRIEF DESCRIPTION OF THE DRAWINGS

The detailed description is described with reference to the accompanying drawings in which:

FIG. 10 illustrates a flowchart of a series of acts for generating a color edited digital image using an image color editing diffusion neural network in accordance with one or more implementations.

FIG. 11 illustrates a flowchart of a series of acts for training an image color editing diffusion neural network in accordance with one or more implementations.

DETAILED DESCRIPTION

Figure 1:
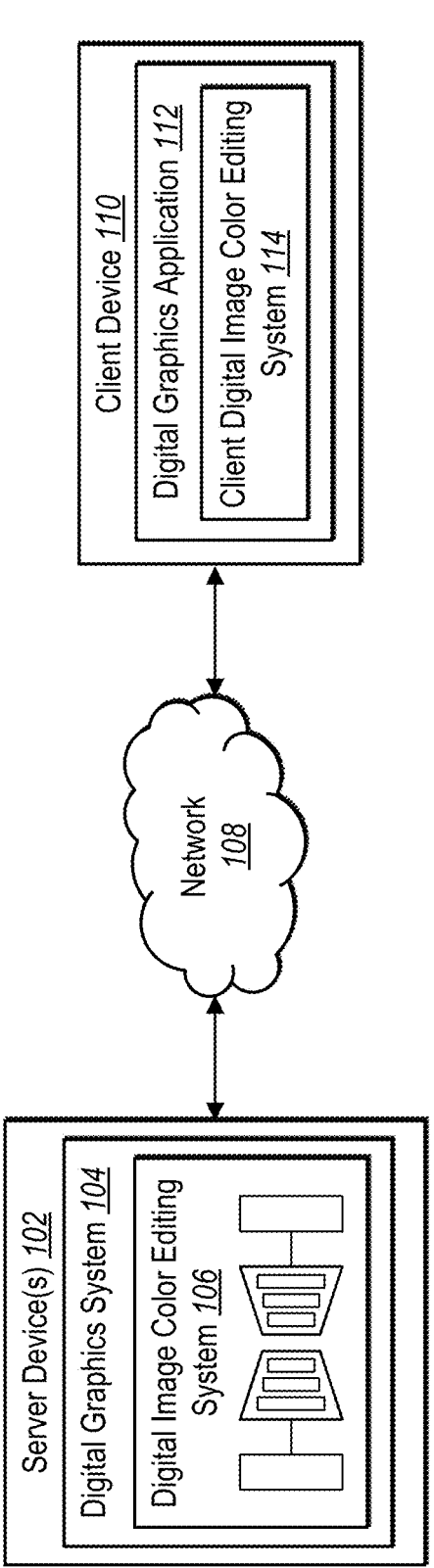
FIG. 1 illustrates a schematic diagram of an example environment in which a digital image color editing system operates in accordance with one or more implementations.

This disclosure describes one or more implementations of a digital image color editing system that utilizes a content aware, color editing diffusion neural network to generate a color edited digital image(s) for a digital image. To perform diversified color editing of digital images, many conventional systems utilize generative adversarial neural networks (GANs). Although many of these conventional systems generate diversified color edits using GANs, such systems have a number of shortcomings, particularly with regards to accurately and flexibly applying color styles to a wide variety of input images regardless of content and understanding image content semantics while performing color editing tasks.

In many instances, conventional systems apply a similar set of color styles to all kinds of input images regardless of content and, therefore, fail to flexibly perform color edits on a wide range of digital images. For example, conventional systems oftentimes utilize GANs for color editing tasks that lack an understanding of content semantics while generating the color edited images. This often results in applying a similar color edit to digital images of varying content even when the color styles do not fit the particular content. As an example, images portraying a natural scene and images depicting portraits of people may have different color editing styles that are aesthetic to the respective content. However, conventional systems are often unable to apply varying color styles to images and, therefore, apply a similar style even if the color style does not aesthetically (and objectively) fit the content depicted within the image. In many cases, such conventional systems utilize GANs that are unable to achieve accurate color edits outside a scope of ground truth edits and training data. Additionally, many conventional systems utilize GANs that primarily utilize spatial alignment during the synthesis process to preserve base structures and contents which limits the model's capability to perform fine-grained regional editing in digital images.

Furthermore, many conventional systems are limited to global color style editing on digital images. Indeed, conventional systems often apply a global color style that edits an entire frame (or image) in a similar direction. Oftentimes, such a global color style editing approach results in improper color tones being forcibly applied to every region and instance of a digital image. Accordingly, many conventional systems generate digital images with color style edits that are unappealing due to the forced application of improper color tones in each region and, often, also include artifacts in the color edited digital images. To illustrate, conventional systems oftentimes force the same color style onto images without considering image content to result in improper color editing (e.g., an image of a crowded sunny beach may be edited to lower brightness, a blue sky with clouds during the day may be projected to midnight purple).

In contrast to such conventional image editing systems, the digital image color editing system generates realistic color edits that are content aware for a wide range of digital images utilizing a content aware, color editing diffusion neural network. In one or more implementations, the digital image color editing system generates, for a digital image utilizing an image color editing diffusion neural network, a color-edited digital image that depicts the content of the digital image in a color style different from the color style of the digital image. To illustrate, the digital image color editing system generates an incomplete digital image from a digital image (or a ground truth color-edited digital image) by removing one or more color space channels and trains the image color editing diffusion neural network (to generate content aware color edited digital images) using the incomplete digital image. In particular, in one or more embodiments, the digital image color editing system trains an image color editing diffusion neural network by generating a denoised color-edited image representation from a ground truth color-edited digital image conditioned on the incomplete digital image (e.g., to jointly train the diffusion network for color restoration tasks).

In one or more embodiments, the digital image color editing system utilizes an image color editing diffusion neural network to generate a color-edited digital image(s) for an input digital image. In particular, in one or more embodiments, the digital image color editing system identifies (or receives) a digital image depicting content in a color style. Moreover, the digital image color editing system utilizes an image color editing diffusion neural network to diffuse a noise representation (conditioned on the digital image) to generate a color edited version of the digital image which depicts the content in an additional (different) color style (e.g., via a generated denoised image representation corresponding to a second color style for the digital image). Indeed, in one or more instances, the digital image color editing system utilizes the image color editing diffusion neural network to generate a diverse set of color edited digital images from the digital image.

In addition, in one or more instances, the digital image color editing system trains the image color editing diffusion neural network to generate content aware, realistic color edited images for a digital image. Indeed, in one or more embodiments, the digital image color editing system trains a color editing diffusion neural network to generate one or more color-edited digital images for a digital image by generating denoised color-edited image representations from a ground truth color-edited digital image conditioned on a digital image. Additionally, to enhance content awareness, in one or more embodiments, the digital image color editing system generates one or more incomplete digital images from the digital image (or the ground truth color-edited digital image) by removing one or more color space channels from the digital image (or the ground truth color-edited digital image). Subsequently, in one or more implementations, the digital image color editing system trains the color editing diffusion neural network to generate one or more color-edited digital images for a digital image by generating denoised color-edited image representations from a ground truth color-edited digital image conditioned on the one or more incomplete digital images (e.g., to jointly train a color restoration task).

In addition, in one or more embodiments, the digital image color editing system utilizes an invertible diffusion encoder to determine a noise representation that indicates a target colors style (from a color edited digital image). Moreover, in one or more implementations, the digital image color editing system also applies a noise representation, which is determined to represent a color style edit between a pair of a raw and edited digital image, to another digital image in the image color editing diffusion neural network to generate a color edit for the other digital image representing the color style edit. Furthermore, in one or more instances, the digital image color editing system also performs language-guided color editing by utilizing a text encoder to encode a text prompt for a desired color style edit and using the encoded text prompt with the color editing diffusion neural network. In some cases, the digital image color editing system utilizes the image color editing diffusion neural network for image harmonization and/or composition.

The digital image color editing system provides a number of advantages relative to conventional digital image editing systems. For example, the digital image color editing system utilizes a color editing diffusion neural network to generate realistic, accurate color edited images for a wide variety of images. Unlike many conventional systems that spatially align to preserve base structure and content, the digital image color editing system utilizes a color editing diffusion neural network that is capable of performing fine-grained regional editing due to an improved spatial alignment of content in the condition image and editing styles. Indeed, in many cases, this improved spatial alignment between a style latent representation and input content (in a digital image) enables the digital image color editing system to generate realistic and accurate color edited images.

In addition, by jointly training the color editing diffusion neural network to restore color in a digital image, the digital image color editing system generates a color editing diffusion neural network that applies color edits to images that are content aware. In contrast to many conventional systems that apply color edits globally, the digital image color editing system leverages multiple auxiliary color restoration tasks during training to enforce the color editing diffusion neural network to learn and utilize input content implicitly in color editing tasks. In particular, by limiting input information in color channels during training of the color editing diffusion neural network, the digital image color editing system generates a color editing diffusion neural network with a deeper understanding of input semantics to generate reasonable color edits on digital images that are adaptive to input content semantics. In addition, by having a deeper understanding of input semantics (i.e., being content aware), the digital image color editing system enables the color editing diffusion neural network to apply color edits on a larger variety of digital images depicting varying content because the color edits are adaptive to the input content semantics (in contrast to globally applying color edits).

Various experimental results confirm these improvements. Indeed, both an image color editing diffusion neural network (trained without auxiliary colorization and/or chrominance-to-luminance tasks) and a jointly trained image color editing diffusion neural network (trained with auxiliary colorization and/or chrominance-to-luminance tasks) outperformed the conventional state-of-the-art model in many cases with a 15% improvement in an FID value, a 27% improvement in an LPIPS value, and a 37% improvement in a variance value. Similarly, an embodiment of the image color editing diffusion neural network (in accordance with one or more implementations herein) outperformed the conventional state-of-the-art model in a user rated feedback study on the quality of output images. Moreover, in an ablation study, the baseline implementation of the image color editing diffusion neural network (without training auxiliary tasks) was significantly boosted by the joint training of the auxiliary tasks. Indeed, the baseline implementation of the image color editing diffusion neural network was progressively enhanced while each auxiliary task was introduced into the implementation.

Turning now to the figures, FIG. 1 illustrates a schematic diagram of one or more implementations of a system 100 (or environment) in which a digital image color editing system operates in accordance with one or more implementations. As illustrated in FIG. 1, the system 100 includes a server device(s) 102, a network 108, and a client device 110. As further illustrated in FIG. 1, the server device(s) 102 and the client device 110 communicate via the network 108.

In one or more implementations, the server device(s) 102 includes, but is not limited to, a computing (or computer) device (as explained below with reference to FIG. 12). As shown in FIG. 1, the server device(s) 102 include a digital graphics system 104 which further includes the digital image color editing system 106. In one or more instances, the digital graphics system 104 generates, stores, modifies, displays, and/or utilizes digital images (and other digital content). Indeed, in one or more embodiments, the digital graphics system 104 provides and/or generates tools to visually edit attributes of digital images and content depicted within the digital images.

Moreover, in one or more embodiments the digital image color editing system 106 generates, trains, stores, deploys, and/or utilizes a color editing diffusion neural network that generates one or more color edited digital images from a digital image. In some implementations, the digital image color editing system 106 jointly trains the color editing diffusion neural network for color restoration tasks to enhance the content awareness of the color editing diffusion neural network. Then, the digital image color editing system 106 utilizes the color editing diffusion neural network with a digital image to generate various color edited reconstructions of the digital image (e.g., various digital images depicting content in different color styles).

Furthermore, as shown in FIG. 1, the system 100 includes the client device 110. In one or more implementations, the client device 110 includes, but is not limited to, a mobile device (e.g., smartphone, tablet), a laptop, a desktop, or any other type of computing device, including those explained below with reference to FIG. 12. In certain implementations, although not shown in FIG. 1, the client device 110 is operated by a user to perform a variety of functions (e.g., via the digital graphics application 112). For example, the client device 110 performs functions such as, but not limited to, utilizing a color editing diffusion neural network (in accordance with one or more embodiments herein) to generate one or more color edited digital images from a digital image.

To access the functionalities of the digital image color editing system 106 (as described above), in one or more implementations, a user interacts with the digital graphics application 112 on the client device 110. For example, the digital graphics application 112 includes one or more software applications installed on the client device 110 (e.g., to utilize a color editing diffusion neural network in accordance with one or more implementations herein). In some cases, the digital graphics application 112 is hosted on the server device(s) 102. In addition, when hosted on the server device(s) 102, the digital graphics application 112 is accessed by the client device 110 through a web browser and/or another online interfacing platform and/or tool.

Although FIG. 1 illustrates the digital image color editing system 106 being implemented by a particular component and/or device within the system 100 (e.g., the server device(s) 102), in some implementations, the digital image color editing system 106 is implemented, in whole or in part, by other computing devices and/or components in the system 100. For example, in some implementations, the digital image color editing system 106 is implemented on the client device 110 within the digital graphics application 112 (e.g., via a client digital image color editing system 114). Indeed, in one or more implementations, the description of (and acts performed by) the digital image color editing system 106 are implemented (or performed by) the client digital image color editing system 114 when the client device 110 implements the digital image color editing system 106. More specifically, in some instances, the client device 110 (via an implementation of the digital image color editing system 106 on the client digital image color editing system 114) generates one or more color edited digital images from a digital image via the color editing diffusion neural network. In some implementations, the digital image color editing system 106 utilizes the server device(s) 102 to train and implement the color editing diffusion neural network. In some implementations, the digital image color editing system 106 utilizes the server device(s) 102 to train the color editing diffusion neural network and deploys the color editing diffusion neural network utilizing the client device 110.

Additionally, as shown in FIG. 1, the system 100 includes the network 108. As mentioned above, in some instances, the network 108 enables communication between components of the system 100. In certain implementations, the network 108 includes a suitable network and may communicate using any communication platforms and technologies suitable for transporting data and/or communication signals, examples of which are described with reference to FIG. 12. Furthermore, although FIG. 1 illustrates the server device(s) 102 and the client device 110 communicating via the network 108, in certain implementations, the various components of the system 100 communicate and/or interact via other methods (e.g., the server device(s) 102 and the client device 110 communicating directly).

Figure 2:
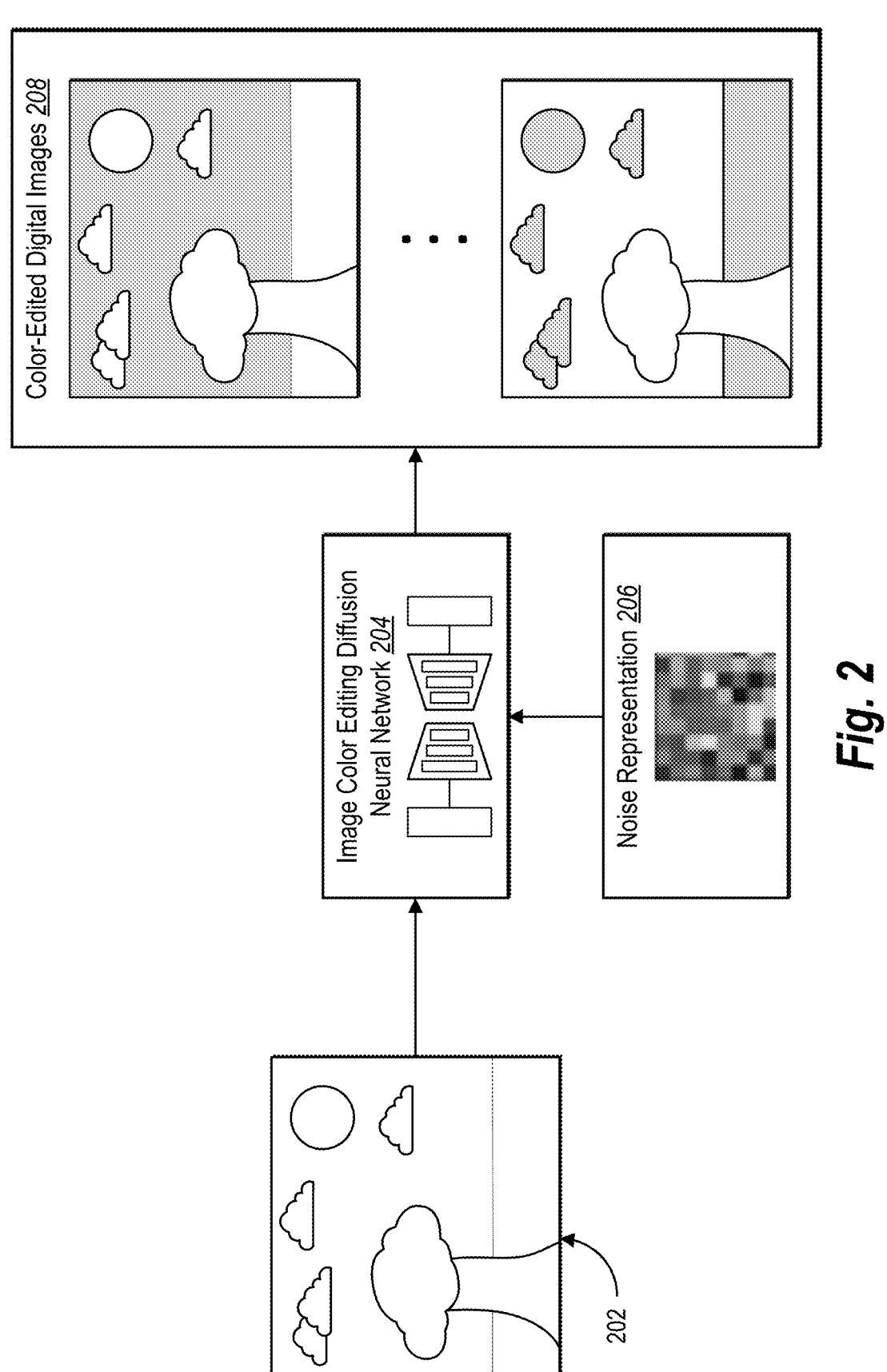
FIG. 2 illustrates an exemplary flow of a digital image color editing system utilizing a color editing diffusion neural network to generate color edited digital images in accordance with one or more implementations.

As mentioned above, in one or more embodiments, the digital image color editing system 106 generates one or more color edited images from a digital image using a content aware color editing diffusion neural network. For example, FIG. 2 illustrates an exemplary flow of the digital image color editing system 106 utilizing a color editing diffusion neural network to generate color edited digital images from a digital image. Indeed, FIG. 2 illustrates the digital image color editing system 106 utilizing a color editing diffusion neural network for diversified color editing of a digital image.

For instance, as shown in FIG. 2, the digital image color editing system 106 provides an input digital image 202 and a noise representation 206 to an image color editing diffusion neural network 204. As further shown in FIG. 2, the digital image color editing system 106 utilizes the image color editing diffusion neural network 204 to generate one or more color edited digital images 208. Indeed, in one or more embodiments, the digital image color editing system 106 denoises the noise representation 206 (via the image color editing diffusion neural network) while conditioning on the input digital image 202. As shown in FIG. 2, the digital image color editing system 106 generates one or more color edited digital images 208 that depict the content of the input digital image 202 with varying color styles (e.g., content and/or regions of the digital images having edited colors, color tones, and/or other visual attributes).

In one or more embodiments, an image (sometimes referred to as a digital image) includes a digital symbol, picture, icon, and/or other visual illustration depicting one or more subjects. For instance, an image includes a digital file having a visual illustration and/or depiction of a subject (e.g., human, place, or thing). Indeed, in some implementations, an image includes, but is not limited to, a digital file with the following extensions: JPEG, TIFF, BMP, PNG, RAW, or PDF. In some instances, an image includes a frame from a digital video file having an extension such as, but not limited to the following extensions: MP4, MOV, WMV, or AVI.

Additionally, in one or more embodiments, a color style includes a combination of colors and/or features for a digital image. For example, a color style includes a set of colors (e.g., via saturation, hue, luminance) and/or tones (e.g., via white balance, shadows, contrast, highlights) of a digital image.

Furthermore, in one or more embodiments, a diffusion neural network (or sometimes referred to as diffusion model) includes a generative model (e.g., a machine learning model) that iteratively denoises a noise representation (e.g., Gaussian noise, random noise) to generate a digital image. In some instances, a diffusion neural network includes a deep generative model that (in training) adds noise to training data and reverses the noise (e.g., denoising) to recover the training data (to learn to remove noise to generate a representation of the training data). Indeed, in one or more embodiments, a trained diffusion neural network denoises random noise representations to generate images.

In some cases, the digital image color editing system 106 utilizes various diffusion models as described in Ho et. al., *Denoising Diffusion Probabilistic Models*, Advances in Neural Information Processing Systems, 33:6840-6851 (2020), Sohl-Dickstein et. al., *Deep Unsupervised Learning using Nonequilibrium Thermodynamics*, International Conference on Machine Learning, pages 2256-2265, PMLR (2015), Rombach et. al., *High-Resolution Image Synthesis with Latent Diffusion Models*, Proceedings of the IEEE/CVF Conference on Computer Vision and Pattern Recognition, pages 10684-10695 (2022), Saharia et. al., *Image Super-Resolution via Iterative Refinement*, IEEE Transactions on Pattern Analysis and Machine Intelligence (2022), and Saharia et. al., *Photorealistic Text-to-Image Diffusion Models with Deep Language Understanding*, arXiv Preprint, arXiv: 2205.11487 (2022), which are incorporated herein by reference in its entirety.

Moreover, in one or more embodiments, an image color editing diffusion neural network includes a diffusion neural network that generates color edited versions of a digital image from noise representations. In particular, in one or more embodiments, an image color editing diffusion neural network denoises a noise representation conditioned on an input image to generate one or more images that represent the input image in varying color styles. Additionally, in some cases, the digital image color editing system 106 utilizes the image color editing diffusion neural network to denoise noise representations conditioned on color space modified versions of training images (e.g., to jointly train colorization tasks) to enhance the content awareness of the color editing diffusion neural network. In one or more implementations, the digital image color editing system 106 utilizes various diffusion neural networks as the image color editing diffusion neural network, such as, but not limited to, a conditional diffusion neural network and/or a latent diffusion model.

Furthermore, in one or more instances, a neural network includes a machine learning model that can be trained and/or tuned based on inputs to generate content or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data.

Additionally, in one or more embodiments, a noise representation includes a set of data (or pixels) that represent (or depict) a noisy image. In particular, in one or more embodiments, the digital image color editing system 106 utilizes a noise representation created from a set of random noise pixels. Indeed, in some cases, a noise representation includes a set of data created from adding noise pixels to an image via randomness and/or statistical randomness, such as, but not limited to Gaussian noise, random noise, white noise. In some implementations, a noise representation includes a set of data (or pixels) that represent characteristics and/or attributes (e.g., features) of digital images in a latent form (e.g., noisy pixels that represent a particular color style).

Figure 3:
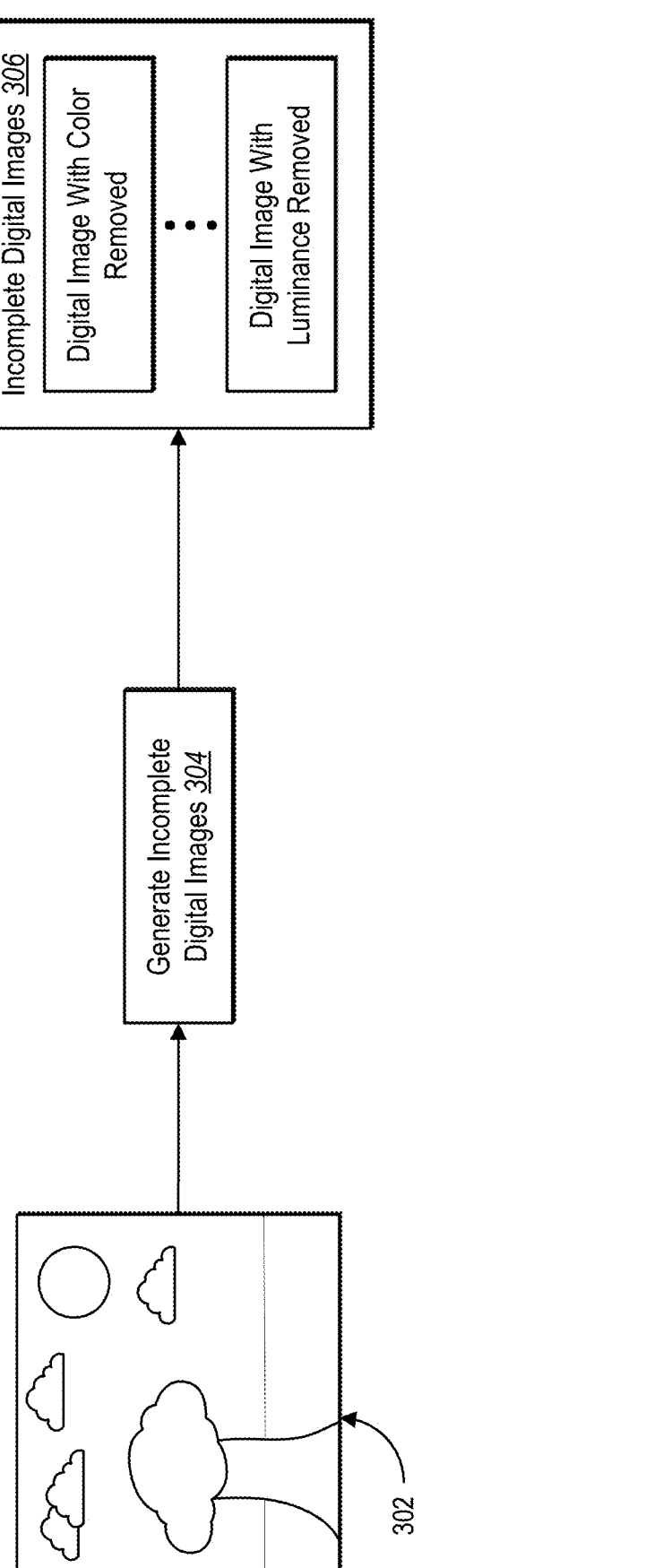
FIG. 3 illustrates a digital image color editing system generating an incomplete digital image in accordance with one or more implementations.

As mentioned above, in one or more embodiments, the digital image color editing system 106 generates an incomplete digital image for utilization in training a content aware image color editing diffusion neural network. For example, FIG. 3 illustrates the digital image color editing system 106 generating an incomplete digital image(s). As shown in act 304 of FIG. 3, the digital image color editing system 106 generates in incomplete digital image 306 from a digital image 302. Indeed, as shown in FIG. 3, the digital image color editing system 106 generates the incomplete digital image 306 from the digital image 302 by generating, but not limited to, a digital image with color removed from the digital image 302 and/or a digital image with luminance removed from the digital image 302.

In one or more embodiments, the digital image color editing system 106 removes one or more color space channels of a digital image to generate an incomplete digital image. For instance, the digital image color editing system 106 removes a color space channel controlling color of a digital image to generate a grayscale image as an incomplete image. In some cases, the digital image color editing system 106 removes a luminance signal (as the color space channel) of an image to generate a degraded image containing chrominance information (as the incomplete image).

Indeed, in one or more embodiments, a color space includes a set of data representing properties belonging to a digital image (or other content), such as, but not limited to, hue, saturation, and/or brightness of light corresponding to the image. For example, a color space includes properties corresponding to a RGB color space, HSV color space, CIELAB color space, and/or a YUV color space. In addition, in one or more instances, a color space channel includes a particular property and/or data type within a color space that represents a specific aspect of the color space. For example, a color space channel includes channel values, such as, but not limited to, a hue value, a saturation value, a temperature value, a luminance value, and/or chrominance value.

In one or more cases, the digital image color editing system 106 generate a grayscale image of a digital image as the incomplete image. For instance, in some cases, the digital image color editing system 106 utilizes a YUV color space of an image to generate in incomplete image. In some cases, the digital image color editing system 106 generates a grayscale image from an image by decomposing a chrominance channel (e.g., UV channel) from a luminance channel (e.g., Y channel). Indeed, in one or more embodiments, the digital image color editing system 106 duplicates the Y color space channel (e.g., three times) to generate a grayscale image from a digital image (e.g., by increasing the luminance information). In some implementations, the digital image color editing system 106 converts the RGB values of an image (by changing the RGB values) to convert a digital image to a grayscale image (as the incomplete image).

In some instances, the digital image color editing system 106 generates a luminance loss image (e.g., only chrominance information) as the incomplete digital image. In one or more embodiments, the digital image color editing system 106 blocks a Y color space channel (of a YUV color space) and maps the color space back to an RGB space to generate an incomplete image. In particular, in one or more embodiments, the digital image color editing system 106 blocks a Y color space by modifying the Y color space to zero and mapping the color space back to RGB space to generate an incomplete digital image (e.g., a degraded image) that includes chrominance information while losing a luminance signal.

Although one or more embodiments describe removing luminance from a digital image color space and/or creating a grayscale version of the digital image as the incomplete image, the digital image color editing system 106, in one or more embodiments, removes various color space channels to generate various types of incomplete images (for training the image color editing diffusion neural network).

Figure 4:
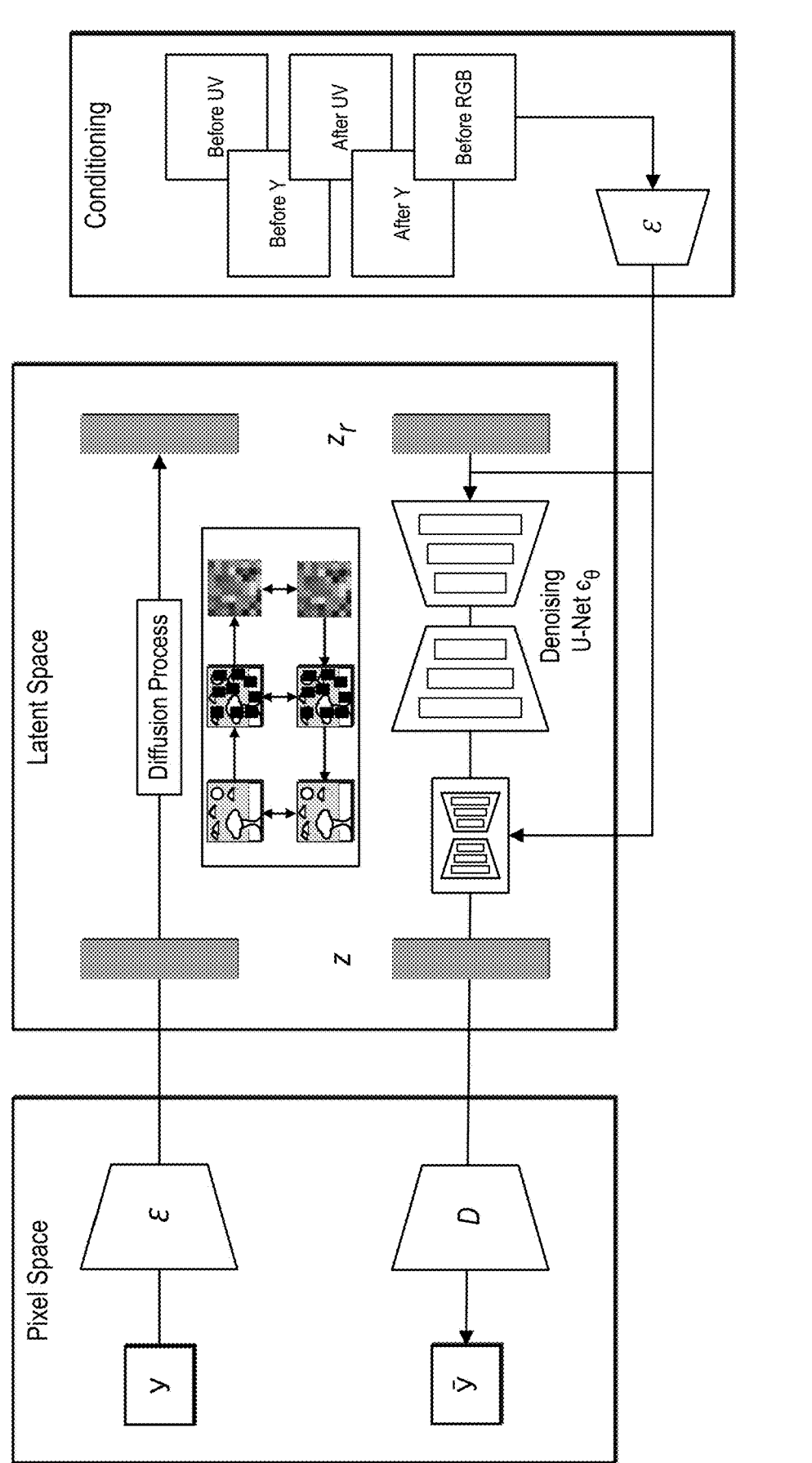
FIG. 4 illustrates a digital image color editing system training a content aware, color editing diffusion neural network in accordance with one or more implementations.

As mentioned above, the digital image color editing system 106 trains a content aware, color editing diffusion neural network to generate one or more color edited digital images from a digital image. For instance, FIG. 4 illustrates the digital image color editing system 106 training a content aware, color editing diffusion neural network. In particular, FIG. 4 illustrates the digital image color editing system 106 training a color editing diffusion neural network to generate one or more color-edited versions of a digital image by denoising noise representations conditioned on an unedited version of the digital image. In addition, FIG. 4 also illustrates the digital image color editing system 106 jointly training the color editing diffusion model for color space restoration tasks to improve the content awareness of the color editing diffusion neural network in generated color edited digital images.

In one or more implementations, the digital image color editing system 106 utilizes a diffusion process to generate a noise representation from a digital image for training of an image color editing diffusion neural network. For example, as shown in FIG. 4, the digital image color editing system 106 utilizes a ground-truth color edited digital image y with an encoder $\xi$ to generate a noise representation z. Indeed, as shown in FIG. 4, the digital image color editing system 106 utilizes a diffusion process to convert the ground-truth color edited digital image y from a pixel space to a latent space as a noise representation $z_r$ (e.g., a random noise representation).

Furthermore, in one or more embodiments, the digital image color editing system 106 trains the image color editing diffusion neural network to generate color-edited digital images by generating (using the diffusion neural network) a denoised color-edited image representation from the ground truth color edited digital image (conditioned on an input digital image and/or an incomplete digital image). For instance, as shown in FIG. 4, the digital image color editing system 106 iteratively utilizes a denoising U-net $\varepsilon_\theta$ to denoise the noise representation $z_r$ (into a denoised color-edited image representation). Indeed, as shown in FIG. 4, the digital image color editing system 106, at each denoising time step, determines a measure of loss for the diffusion neural network by comparing a denoised representation generated from the denoising U-net $\varepsilon_\theta$ to a noise representation of the ground truth color edited digital image y (at a matching diffusion time step).

In addition, as shown in FIG. 4, during denoising of the noise representations $z_r$ into a denoised color-edited image representation, the digital image color editing system 106 also conditions the denoising on an input digital image (e.g., an unedited version of the digital image) at each denoising time step. For example, as shown in FIG. 4, the digital image color editing system 106 introduces the unedited digital image (e.g., "before RGB") into the latent space via an encoder $\xi$ and conditions the denoising of the noise representation $z_r$ to the denoised color-edited image representation on the unedited digital image (e.g., "before RGB").

Moreover, as shown in FIG. 4, during denoising of the noise representations $z_r$ into a denoised color-edited image representation, the digital image color editing system 106 also individually conditions the denoising on one or more incomplete versions of the input digital image at each denoising time step to enhance the content awareness of the image color editing diffusion neural network. For instance, as shown in FIG. 4, the digital image color editing system 106 introduces an unedited version of the digital image without color (e.g., "before UV") into the latent space via the encoder $\varepsilon$ and conditions the denoising of the noise representation $z_r$ to the denoised color-edited image representation on the unedited version of the digital image without color (e.g., "before UV"). Furthermore, as also illustrated in FIG. 4, the digital image color editing system 106 also introduces an unedited version of the digital image without luminance (e.g., "before Y") into the latent space via the encoder $\varepsilon$ and conditions the denoising of the noise representation $z_r$ to the denoised color-edited image representation on the unedited version of the digital image without luminance (e.g., "before Y") (e.g., in a different and/or alternative training step).

Furthermore, as also shown in FIG. 4, during denoising of the noise representations $z_r$ into a denoised color-edited image representation, the digital image color editing system 106 also individually conditions the denoising on one or more incomplete versions of the ground truth color edited digital image at each denoising time step to enhance the content awareness of the image color editing diffusion neural network. For instance, as shown in FIG. 4, the digital image color editing system 106 introduces a ground truth color edited digital image without color (e.g., "after UV") into the latent space via the encoder & and conditions the denoising of the noise representation $z_r$ to the denoised color-edited image representation on the ground truth color edited digital image without color (e.g., "after UV"). Moreover, as illustrated in FIG. 4, the digital image color editing system 106 introduces the ground truth color edited digital image without luminance (e.g., "after Y") into the latent space via the encoder $\underset{\sim}{\varepsilon}$ and conditions the denoising of the noise representation $z_r$ to the denoised color-edited image representation on the ground truth color edited digital image without luminance (e.g., "after Y") (e.g., in a different and/or alternative training step).

As further shown in FIG. 4, the digital image color editing system 106 iteratively utilizes denoised representations of the ground truth color edited image (with noise representations of the ground truth color edited image) conditioned on the one or more input digital images and incomplete versions of the input image and/or the ground truth color edited image to learn parameters of the color editing diffusion neural network. Indeed, as shown in FIG. 4, the digital image color editing system 106 trains the image color editing diffusion neural network to generate a denoised version of the ground truth color edited image (e.g., via a decoder D) to generate an output color-edited digital image $\hat{y}$ (e.g., that is similar to the color edited ground truth digital image). In particular, the digital image color editing system 106 trains the image color editing diffusion neural network to, at inference, denoise a noise representation conditioned on an input unedited digital image to generate a color edited version of the digital image. In addition, as described below, the digital image color editing system 106 also trains the image color editing diffusion neural network such that the image color editing diffusion neural network generates the color edited version of the digital image in different color styles based on different input noise representations.

To illustrate, in one or more embodiments, the digital image color editing system 106 utilizes an image color editing diffusion neural network in a multimodal image-to-image translation task to complete a diversified image color editing. Indeed, in one or more embodiments, the digital image color editing system 106 utilizes a diffusion model which includes a forward diffusion process that progressively adds Gaussian noise to a data point (e.g., an image) and a reversed denoising process generating a data point (e.g., an image) from a random noise representation. Indeed, in some cases, the digital image color editing system 106 utilizes the following function as part of the diffusion model:

$$q\left(x_{1:T} \mid x_0\right) = \prod_{t=1}^{T} \mathcal{N}\left(x_t - 1; \sqrt{\alpha}\, x_{t-1}, (1 - \alpha_t)I\right) \tag{1}$$

Furthermore, in the above-mentioned function (1), the digital image color editing system 106 represents $\alpha$ as hyperparameters for the noise schedule. In addition, in one or more embodiments, the digital image color editing system 106 marginalizes the forward process of the image color editing diffusion neural network at each time step t in accordance with the following function:

$$q(x_T \mid x_0) = \mathcal{N}(x_t; \gamma_t x_0, (1 - \gamma_t)I) \tag{2}$$

In the above-mentioned function (2), the digital image color editing system 106 represents $\oplus_t$ as $$\prod_t' \alpha_t'.$$

Additionally, in one or more embodiments, the digital image color editing system 106 utilizes a reparameterization trick to formulize the forward diffusion process of the image color editing diffusion neural network as a stepwise operation in accordance with the following function:

$$z := (x_T \oplus \epsilon_T \oplus \ldots \oplus \epsilon_1) \sim \mathcal{N}(0, 1), \tag{3}$$

$$x_{t-1} = \mu_T(x_t, t) + \sigma_t \odot \epsilon_t, \, t = T, \ldots, 1$$

In the above-mentioned function (3), the digital image color editing system 106 utilizes @ to denote a concatenation and, in addition, represents Gaussian parameterization in accordance with the following function:

$$\mu = \frac{\sqrt{\gamma_t - 1}\,(1 - \alpha_t)}{1 - \gamma_t} x_0 + \frac{\sqrt{\alpha_t}\,(1 - \gamma_{t-1})}{1 - \gamma_t} x_t, \tag{4}$$

$$\sigma^2 = \frac{(1 - \gamma_{t-1})(1 - \alpha_t)}{1 - \gamma_t}$$

In particular, the digital image color editing system 106 utilizes the image color editing diffusion neural network to learn a mapping $f:X \rightarrow Y$ in which each input image x in a domain of unedited digital images X (before-edited images) are mapped into a color edited image y in a domain of color edited images Y (after-edited images). In one or more embodiments, the digital image color editing system 106 trains the image color editing diffusion neural network to capture a multimodal distribution of color edited images (e.g., to capture multiple possible aesthetic editing styles in a color edited image domain). Indeed, in one or more implementations, the digital image color editing system 106 trains the image color editing diffusion neural network (f) to utilize a random noise representation z to generate color edited images y (i.e., y=f(x,z)) in which the output color edited images y are different given different noise representations z (while still populate in the domain of color edited images Y).

Moreover, in one or more embodiments, the digital image color editing system 106 utilizes a conditional diffusion model that applies a conditional input to each step of a denoising process to make the entire content generation process conditional to an input image (and/or one or more incomplete versions of the input image). Furthermore, in one or more instances, the digital image color editing system 106 utilizes a latent diffusion model to extend the diffusion process from a pixel space to a latent space for increased computational efficiency (e.g., by reducing the computational burden by decreasing the variable dimension of the diffusion model).

In one or more embodiments, the digital image color editing system 106 utilizes a latent diffusion model-based image color editing diffusion neural network in two stages. In a first stage, the digital image color editing system 106 trains an encoder $\varepsilon$ and a decoder D to bi-directionally convert a pixel space to a latent space. Moreover, in a second stage, the digital image color editing system 106 utilizes the (latent diffusion model-based) image color editing diffusion neural network trains a denoising U-Net $\varepsilon_\theta$ with parameter $\theta$ to generate a low-dimensional latent representation of a target image (e.g., a ground truth color edited image). Moreover, at each time step t of the training process, the digital image color editing system 106 concatenates an input condition x together with a noise representation $z_t$ using the following training function:

$$L_{LDM} := \mathbb{E}_{\mathcal{E}(y),x,\varepsilon \sim \mathcal{N}(0,1),t} \|\epsilon - \epsilon_\theta(z_t \oplus \varepsilon(x), t\|_n \qquad (5)$$

In the above-mentioned function (5), the digital image color editing system 106 utilizes an input digital image x and a concatenation operation $\oplus$ for the input condition x and the noise representation $z_t$. Furthermore, in the above-mentioned function (5), the digital image color editing system 106 utilizes n to indicate different measures of loss (e.g., L1 loss, L2 loss).

Additionally, as mentioned above, in one or more embodiments, the digital image color editing system 106 jointly trains the image color editing diffusion model for color space restoration tasks to enhance the content awareness of the image color editing diffusion neural network. In one or more implementations, the digital image color editing system 106 jointly trains the image color editing diffusion neural network with a colorization task (for a ground truth color edited image and/or an unedited version of the digital image). In particular, the digital image color editing system 106 utilizes one or more incomplete images to jointly train the image color editing diffusion neural network to map a grayscale version of an image to a colorful image (such that the generated color is highly dependent on the input content and semantics). In one or more instances, the colorization task causes the image color diffusion neural network to understand (or learn) the semantics of an input image. In particular, during training of the image color editing diffusion neural network, the digital image color editing system 106 jointly trains the color editing task and the colorization task (which share the same target image) to generate an image color editing neural network with a strong semantic understanding ability (without compromising the aesthetic and style of the output color edited image).

In one or more instances, the digital image color editing system 106 removes color space channels from a color space of the image to generate a grayscale image (e.g., an incomplete image as described above) for a colorization task. Indeed, in some cases, the digital image color editing system 106 generates a grayscale image from an image by decomposing a chrominance channel (e.g., UV channel) from a luminance channel (e.g., Y channel). Moreover, in some instances, the digital image color editing system 106 (for the colorization task), constructs the grayscale image by duplicating the luminance channel (e.g., three times) to maintain the shape of the original digital image. Furthermore, in one or more instances, the digital image color editing system 106 utilizes the colorization task to achieve a target image as the RGB (e.g., color) image of the grayscale image.

In one or more implementations, the digital image color editing system 106 utilizes the grayscale version of a ground truth color edited digital image to predict a colorful RGB version (or format) of the ground truth color edited digital image. Additionally, in some cases, the digital image color editing system 106 inputs the grayscale image of the unedited image (e.g., the original digital image) to predict an after-edited RGB image (e.g., a color edited version of the digital image with color). Indeed, in one or more instances, the digital image color editing system 106 utilizes the differences in the luminance of the input grayscale image and the luminance of the target RGB image to cause the image color diffusion model to learn the luminance change. In one or more implementations, the digital image color editing system 106 utilizes one or both of the tasks of colorizing the grayscale version of a ground truth color edited digital image and/or colorizing the grayscale image of the unedited image as part of the measure of loss while learning parameters of the image color editing diffusion neural network.

In one or more implementations, the digital image color editing system 106 jointly trains the image color editing diffusion neural network with a chrominance-to-luminance completion task (for a ground truth color edited image and/or an unedited version of the digital image). In particular, the digital image color editing system 106 utilizes an incomplete image to jointly train the image color editing diffusion neural network to utilize an incomplete image (with a missing luminance channel) to output a target image (e.g., an RGB target image) with the missing luminance channel. For example, the digital image color editing system 106 generates an incomplete image (as described above) with a luminance channel of an image blocked (e.g., a Y channel of 0) and the color space mapped to an RGB space. Indeed, the resulting incomplete digital image includes chrominance information without the luminance signal.

Moreover, in one or more instances, the digital image color editing system 106 utilizes the image color editing diffusion neural network to generate a target image (e.g., an RGB target image) with the missing luminance channel restored. In one or more implementations, by training the image color editing diffusion neural network for the chrominance-to-luminance completion task, the digital image color editing system 106 generates an image color editing diffusion neural network that comprehends a chrominance space to estimate an appropriate luminance (e.g., which improves the luminance quality of the output color edited images). Additionally, in one or more implementations, the digital image color editing system 106 utilizes one or both of the tasks of chrominance-to-luminance completion of a ground truth color edited digital image missing a luminance channel and/or the unedited image missing a luminance channel as part of the measure of loss while learning parameters of the image color editing diffusion neural network.

In one or more instances, the digital image color editing system 106 trains the image color diffusion neural network for various combinations of the auxiliary tasks (e.g., colorization task and/or chrominance-to-luminance completion tasks) along the main objective of color editing by using a combination of a measure of loss. In particular, in one or more instances, the digital image color editing system 106 determines a measure of loss for each of the tasks (e.g., the auxiliary tasks with the color editing task) through the iterative denoising process (as described above). Additionally, the digital image color editing system 106 utilizes the multiple measures of losses (e.g., via a combination) to learn parameters of the image color editing diffusion neural network.

As an example, the digital image color editing system 106 generates (utilizing a loss function) a measure of loss between denoised color-edited image representations (e.g., from a reverse diffusion process) and a ground truth color-edited digital image representation (e.g., from a forward diffusion process) while conditioned on an unedited digital image. In some instances, the digital image color editing system 106 utilizes the measure of loss to modify parameters of the image color editing diffusion neural network (e.g., utilizing gradient descent and back propagation). Furthermore, in one or more embodiments, the digital image color editing system 106 utilizes an incomplete digital image from the digital image and/or ground truth color edited digital image to generate an additional measure of loss between denoised color-edited image representations (e.g., from a reverse diffusion process) and a ground truth color-edited digital image representation (e.g., from a forward diffusion process) while conditioned on an incomplete digital image (e.g., to jointly train for colorization and/or chrominance-to-luminance completion as described above). In one or more cases, the digital image color editing system 106 utilizes the additional measure of loss to also modify parameters of the image color editing diffusion neural network. Indeed, in one or more implementations, the digital image color editing system 106 determines a measure of loss for the color editing task of the image color editing diffusion neural network conditioned on various incomplete images (for various auxiliary color space restoration tasks).

Additionally, in one or more embodiments, the digital image color editing system 106 utilizes the one or more measures of losses to train (or learn parameters) of the image color editing diffusion neural network. For instance, in some cases, the digital image color editing system 106 modifies parameters of the image color editing diffusion neural network for each of the measure of losses. In one or more embodiments, the digital image color editing system 106 combines the measures of losses from the one or more of the various combinations of the auxiliary tasks (e.g., colorization task and/or chrominance-to-luminance completion tasks) along the main objective of color editing and learns (or modifies) parameters of the image color editing diffusion neural network using the combined measure of loss. For instance, in one or more embodiments, the digital image color editing system 106 sums the one or more measures of losses to generate a combined measure of loss for learning parameters of the image color editing diffusion neural network. Additionally, in one or more cases, the digital image color editing system 106 utilizes the various combinations of the auxiliary tasks (e.g., colorization task and/or chrominance-to-luminance completion tasks) along the main objective of color editing to degrade the input image from different perspectives (while maintaining the shape of the input and output image between the tasks) such that the measure of losses are combined without modifying a structure of the image color editing diffusion neural network between the one or more auxiliary tasks.

In some cases, the digital image color editing system 106 augments training data (e.g., input digital images and ground truth color edited digital images) via color perturbations. In particular, in one or more instances, the digital image color editing system 106 augments chrominance and/or luminance in input digital images and ground truth color edited digital images (of the training data set) to improve the generative quality of the image color editing diffusion neural network. For example, in some cases, the digital image color editing system 106 applies four types of image color perturbations on the input images (and/or the ground truth color edited digital images), such as, but not limited to hue, saturation, brightness, and contrast.

Although one or more embodiments illustrate the digital image color editing system 106 jointly training the image color editing diffusion model for color space restoration tasks, the digital image color editing system 106, in some embodiments, trains the image color editing diffusion model directly conditioned on an unedited version of a digital image to generate a version of a ground truth color edited digital image by denoising a noise representation into a representation of a ground truth color edited digital image corresponding to the digital image.

Figure 5:
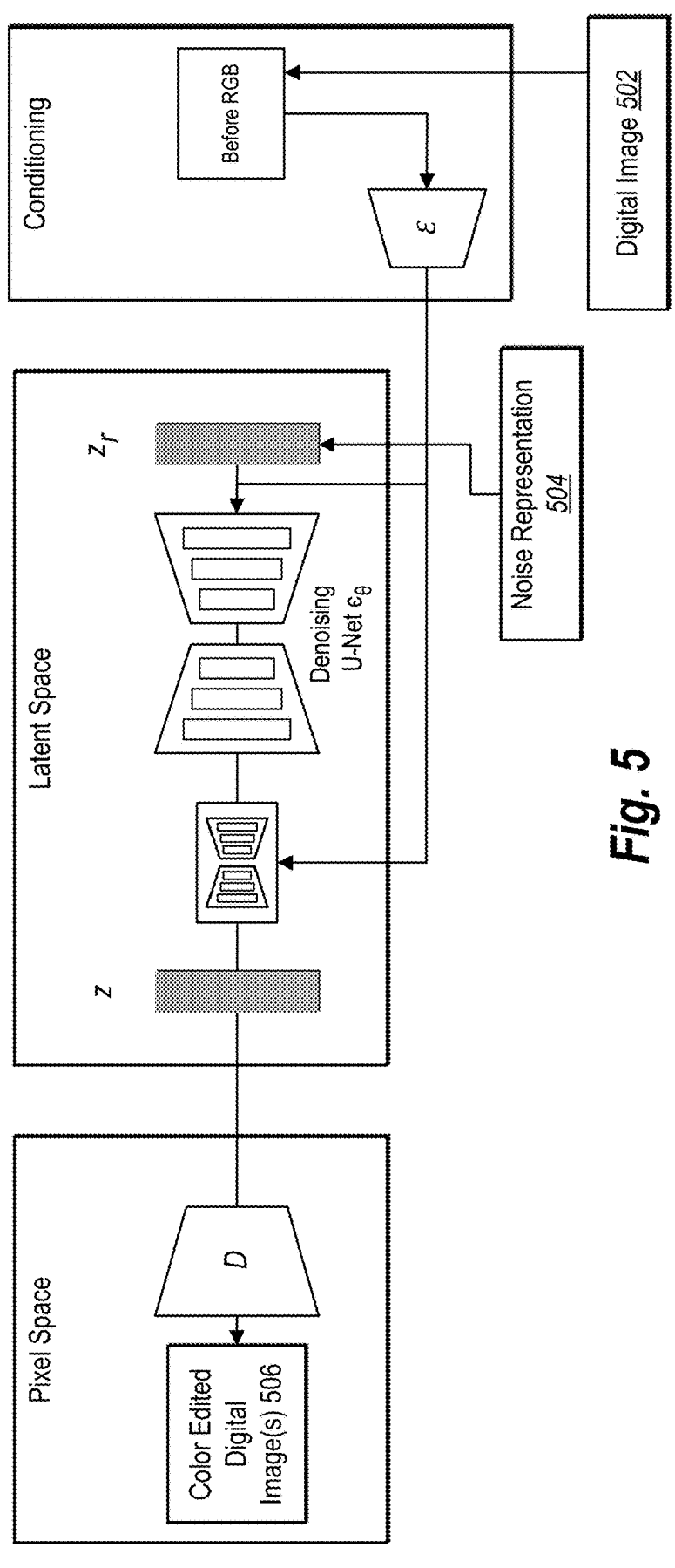
FIG. 5 illustrates a digital image color editing system utilizing an image color editing diffusion neural network to generate a color edited digital image in accordance with one or more implementations.

As further mentioned above, in one or more embodiments and during inference, the digital image color editing system 106 utilizes the trained image color diffusion neural network with an input unedited digital image to generate various color edited versions of the input digital image. For example, FIG. 5 illustrates the digital image color editing system 106 utilizing an image color editing diffusion neural network to generate one or more color edited digital images for an input unedited digital image (via a generated denoised image representation of the one or more color-edited digital images). Indeed, FIG. 5 illustrates the digital image color editing system 106 utilizing an input image and a noise representation with a trained, content aware image color diffusion neural network (as described above) to generate one or more color edited versions of the input image.

As shown in FIG. 5, the digital image color editing system 106 identifies (or receives) an unedited, input digital image 502 (e.g., "before RGB image") in a first color style. Furthermore, as shown in FIG. 5, the digital image color editing system 106 also identifies (or receives) a noise representation 504. As illustrated in FIG. 5, the digital image color editing system 106 utilizes the denoising U-Net Ee of the image color editing diffusion neural network to iteratively denoise the noise representation 504 (e.g., a noise representation $z_r$) conditioned on the input digital image 502 (e.g., a latent space representation of the input digital image 502 from the encoder E). Indeed, as shown in FIG. 5, the digital image color editing system 106 denoises the noise representation 504 conditioned on the input digital image 502 that is decoded with the decoder D of the image color editing diffusion neural network (from a latent space to a pixel space) to generate a color edited digital image(s) 506 that depicts the similar (or the same) content of the digital image 502 in a second color style (e.g., a different color style from the first color style). Indeed, as shown in FIG. 5, the digital image color editing system 106 utilizes the denoising U-Net Ee to generate a denoised image representation of the digital image in a second color style and utilizes the denoised image representation with the decoder D to generate the color edited digital image(s) 506.

In one or more embodiments, the digital image color editing system 106 utilizes various noise representations to achieve different target color style edits with the image color editing diffusion neural network. For instance, varying a random noise representation with the image color editing diffusion neural network causes the image color editing diffusion neural network to generate a color edited digital image (for an input digital image) with a varying color style. Indeed, by using different noise representations with the image color editing diffusion neural network, the digital image color editing system 106, in one or more embodiments, generates a diverse set of color edited digital images.

Furthermore, in some cases, the digital image color editing system 106 identifies (or stores) particular noise representations that represent particular target color styles. Indeed, the digital image color editing system 106 utilizes a particular noise representation with the image color editing diffusion neural network to cause the image color editing diffusion neural network (with a digital image) to generate a color edited digital image having a particular target color style corresponding to the particular noise representation. Indeed, in one or more embodiments, the digital image color editing system 106 creates a repository of particular noise representations that enables the application of particular target color styles via the image color editing diffusion neural network (on various input digital images).

In some cases, the digital image color editing system 106 provides, for display, within a graphical user interface of a client device, one or more selectable options for target color styles. Upon receiving a selection of a selectable option for a particular target color style, the digital image color editing system 106 identifies a corresponding noise representation for the selected particular target color style (e.g., via a mapping between noise representations and target color styles). Then, the digital image color editing system 106 utilizes the selected noise representation for the selected target color style with the image color editing diffusion neural network (and an input digital image) to generate a color edited digital image having the selected target color style.

In one or more implementations, the digital image color editing system 106 provides, for display within a graphical user interface of a client device, one or more color edited digital images (generated using an image color editing diffusion neural network as described above). In particular, in one or more cases, the digital image color editing system 106 provides, for display within the graphical user interface of the client device, a color edited digital image (generated using the image color editing diffusion neural network as described above) for an input digital image in response to receiving the input digital image via the client device (or a user selection from the client device). In some implementations, the digital image color editing system 106 provides, for display within the graphical user interface of the client device, a diversified set of color edited digital images (generated using the image color editing diffusion neural network as described above) for an input digital image in response to receiving the input digital image via the client device (or a user selection from the client device).

Although one or more embodiments illustrate a particular structure for an image color editing diffusion neural network, the digital image color editing system 106, in one or more implementations, utilizes an image color editing diffusion neural network with various forward and/or reverse diffusion processes, neural network components, and/or conditioning tasks to generate color edited digital images (in accordance with one or more embodiments herein).

Figure 6:
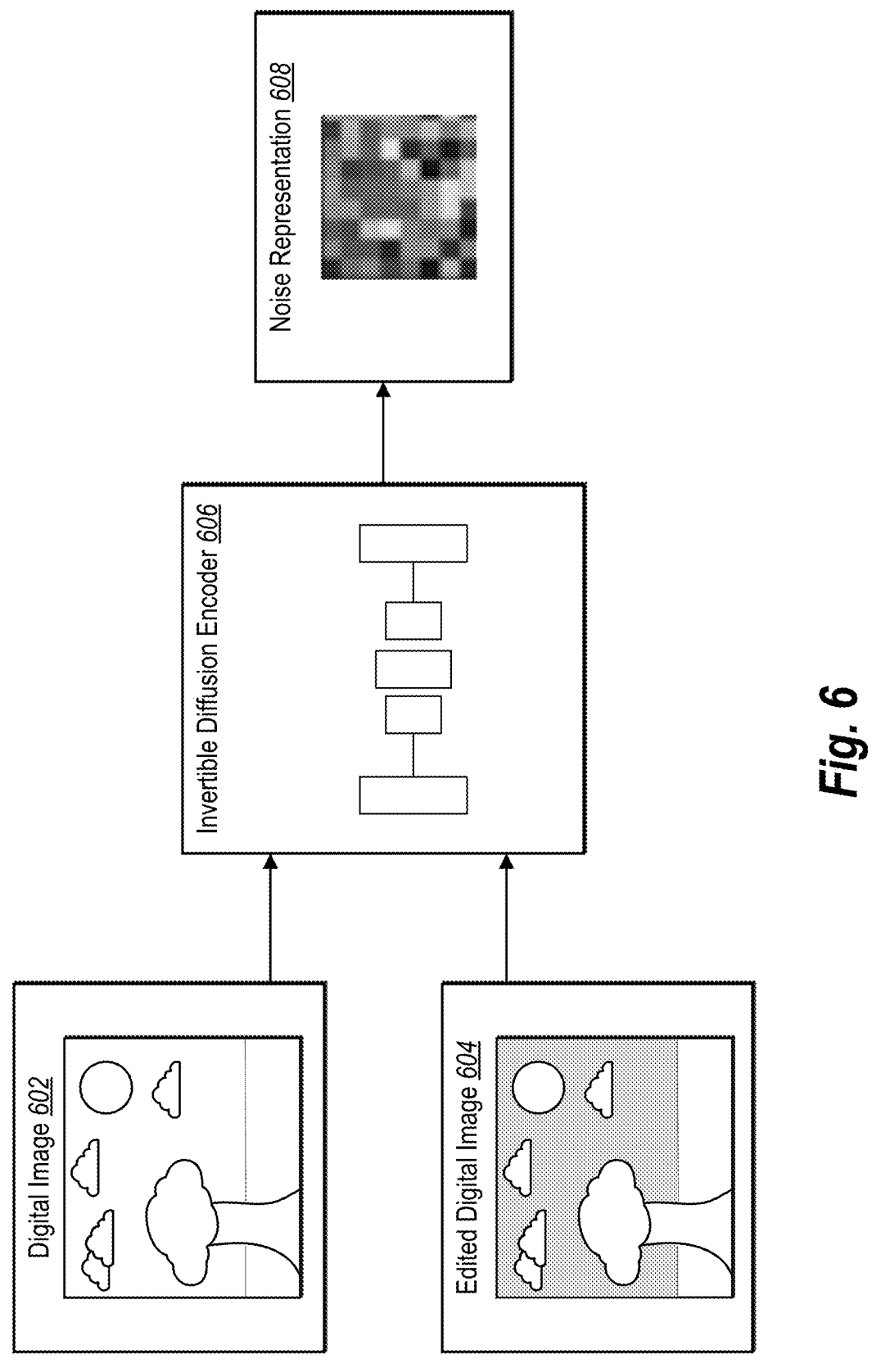
FIG. 6 illustrates a digital image color editing system utilizing an invertible diffusion encoder to determine a noise representation indicating a target color style in accordance with one or more implementations.

As mentioned above, in some instances, the digital image color editing system 106 utilizes an invertible diffusion encoder to determine a noise representation that indicates a target color style (from a digital image and/or a color edited digital image). For instance, FIG. 6 illustrates the digital image color editing system 106 utilizing an invertible diffusion encoder to determine a noise representation indicating a target color style. In particular, as shown in FIG. 6, the digital image color editing system 106 identifies a digital image 602 (e.g., an unedited digital image) and an edited digital image 604 (e.g., a color style edited version of the unedited digital image). Moreover, as further shown in FIG. 6, the digital image color editing system 106 utilizes the digital image 602 and the edited digital image 604 with an invertible diffusion encoder 606 to generate a noise representation 608. In one or more instances, the digital image color editing system 106 generates the noise representation 608 to reflect an editing direction between the unedited digital image 602 (e.g., a raw digital image) and the color edited digital image (e.g., an edited digital image).

In particular, in one or more embodiments, the digital image color editing system 106 utilizes latent noise space inversion to generate a noise representation that indicates a target color style (from a digital image and/or a color edited digital image). In particular, in one or more embodiments, the digital image color editing system 106 utilizes an invertible diffusion model encoder to map an image (e.g., a generated color edited image, color edited image) back into a latent space (to determine a noise representation representative of the image). In one or more instances, the digital image color editing system 106 utilizes a latent encoder ¿ and one or more input conditions (as the invertible diffusion model encoder) to inverse a digital image back to a noise space. For instance, the digital image color editing system 106, for an image color editing diffusion neural network that translates a raw image x to a color edited image y, with a latent noise $z_r := \in_r \oplus \varepsilon(x)$, the digital image color editing system 106 inverses the color edited image y back to a noise representation in accordance with the following function:

$$y_1, \ldots, y_{T-1}, y_T \sim q(y_{1:T} \mid y_0), \qquad (6)$$

$$\epsilon_t = \left( y_{t-1} = \mu_\theta(y_t, \varepsilon(x), t)/\sigma_t \ominus \varepsilon(x) \right)$$

In the above-mentioned function (6), the digital image color editing system 106 represents $\ominus$ as splitting as inverse concatenation and t=T, . . . , 1. In one or more embodiments, the digital image color editing system 106 performs latent inversion natively (e.g., in a same manner as inference of an image color diffusion neural network) without backpropagation or finetuning of the latent or utilizing an external style encoder. Indeed, in some instances, the digital image color editing system 106 performs latent inversion (in accordance with one or more embodiments herein) with increased computational efficiency in comparison to GAN-based conventional methods (e.g., 10 times faster than various conventional systems on images).

In some instances, the digital image color editing system 106 utilizes an invertible diffusion encoder as described in Wu et. al., *Unifying Diffusion Models' Latent Space, with Applications to Cycle diffusion and Guidance*, ArXiv Preprint, ArXiv: 2210.05559 (2022), which is incorporated by reference herein in its entirety.

As also mentioned above, in one or more implementations, the digital image color editing system 106 applies a noise representation determined to represent a color style edit between a pair of a raw and edited digital image to another digital image in the image color editing diffusion neural network to generate a color edit for the other digital image representing the color style edit. For example, FIG. 7 illustrates the digital image color editing system 106 determining a target style noise representation determined from an edit of a digital image to another digital image in the image color editing diffusion neural network.

Figure 7:
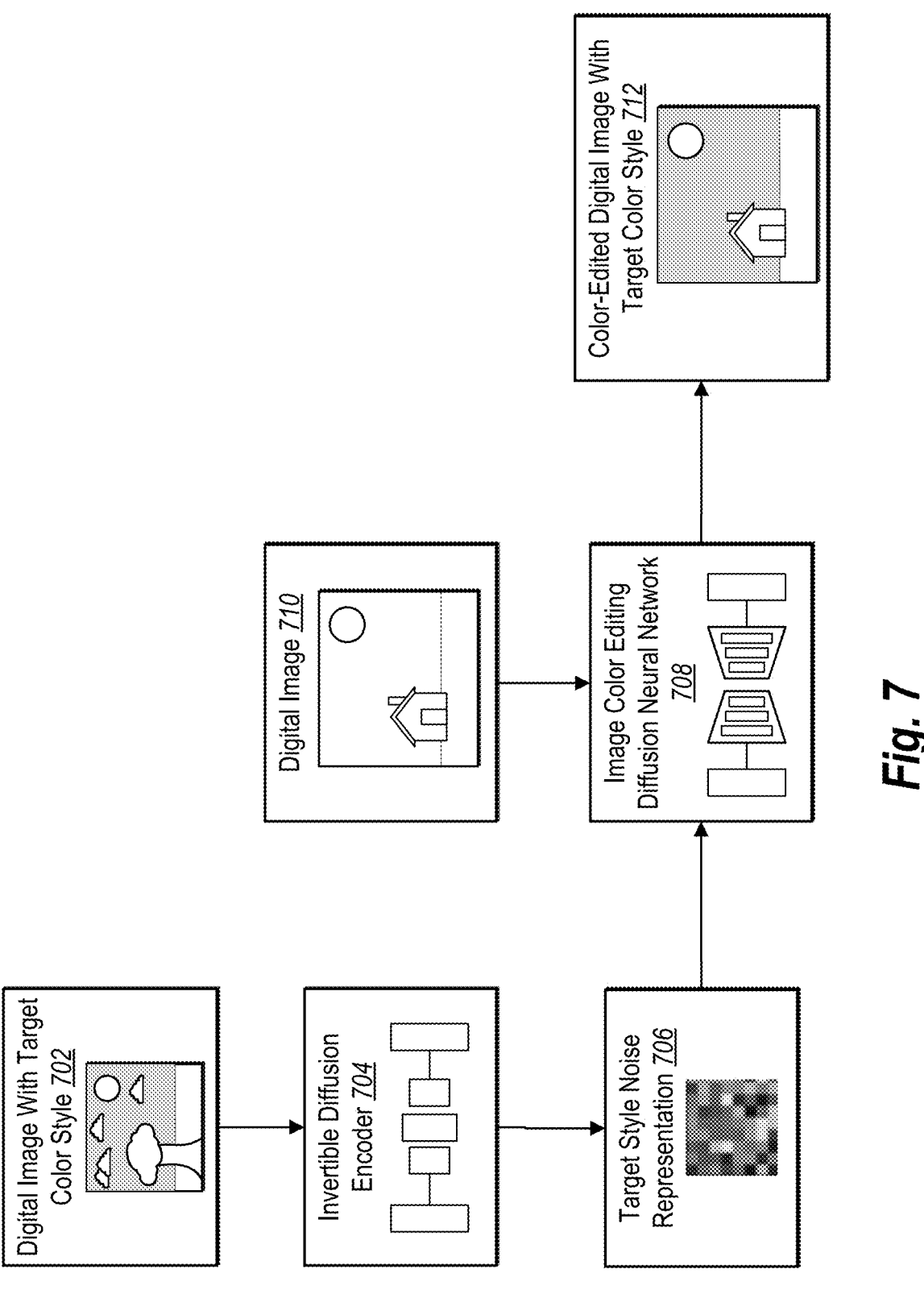
FIG. 7 illustrates a digital image color editing system applying a target style noise representation from a digital image to another digital image utilizing an image color editing diffusion neural network in accordance with one or more implementations.

Indeed, as shown in FIG. 7, the digital image color editing system 106 utilizes a digital image with a target color style 702 with an invertible diffusion encoder 704 to generate a target style noise representation 706 (e.g., reflecting an editing direction from an unedited digital image to the digital image with a target color style 702). Moreover, as shown in FIG. 7, the digital image color editing system 106 further utilizes the determined target style noise representation 706 and another digital image 710 with an image color editing diffusion neural network 708 to generate a color-edited digital image with the target color style 712 (e.g., a zero-shot color style transfer). For example, the digital image color editing system 106 generates the color-edited digital image with the target color style 712 as a color edited version of the digital image 710 with the target color style represented in the target style noise representation 706).

Indeed, in one or more embodiments, the digital image color editing system 106 can utilize a pair of a raw and edited image (e.g., a digital image with a target color style and an unedited version of the digital image) to inverse (as described herein) to acquire (or generate) a noise representation representing the target color editing style in the image color editing diffusion neural networks noise space. Furthermore, in one or more embodiments, the digital image color editing system 106 utilizes the generated noise representation representing the target color editing style and an additional digital image with the image color editing diffusion neural network to apply the target color editing style to the additional digital image. In particular, in one or more implementations, the digital image color editing system 106 utilizes the denoises the noise representation representing the target color editing style conditioned on the additional digital image (in the image color editing diffusion neural network) to generate a color edited version of the additional digital image reflecting the target color editing style.

Indeed, in one or more cases, the digital image color editing system 106 performs the above-mentioned color style transfer task as a zero-shot color style transfer. In particular, in one or more embodiments, the digital image color editing system 106, for a given exemplar image pair consisting of a source image x, its target edited version image y, and a new input image x', utilizes an image color editing diffusion neural network to edit the new input image x' into a color edited version image y' with the same color editing style as the target edited version image y. In one or more embodiments, the digital image color editing system 106 utilizes an invertible diffusion encoder DPMEnc (as described above) to regenerate images in a new domain or with new conditions using inversed noise representations z for color style transfers with an image color editing diffusion neural network (e.g., G) in accordance with the following function:

$$z \sim DPMEnc(z \mid (y, x), G), \qquad (7)$$

$$y' = G(x', z)$$

Additionally, as mentioned above, in one or more instances, the digital image color editing system also performs language-guided color editing by utilizing a text encoder to encode a text prompt for a desired color style edit and using the encoded text prompt with the color editing diffusion neural network. For instance, FIG. 8 illustrates the digital image color editing system 106 performing language-guided color editing using an image color editing diffusion neural network.

Figure 8:
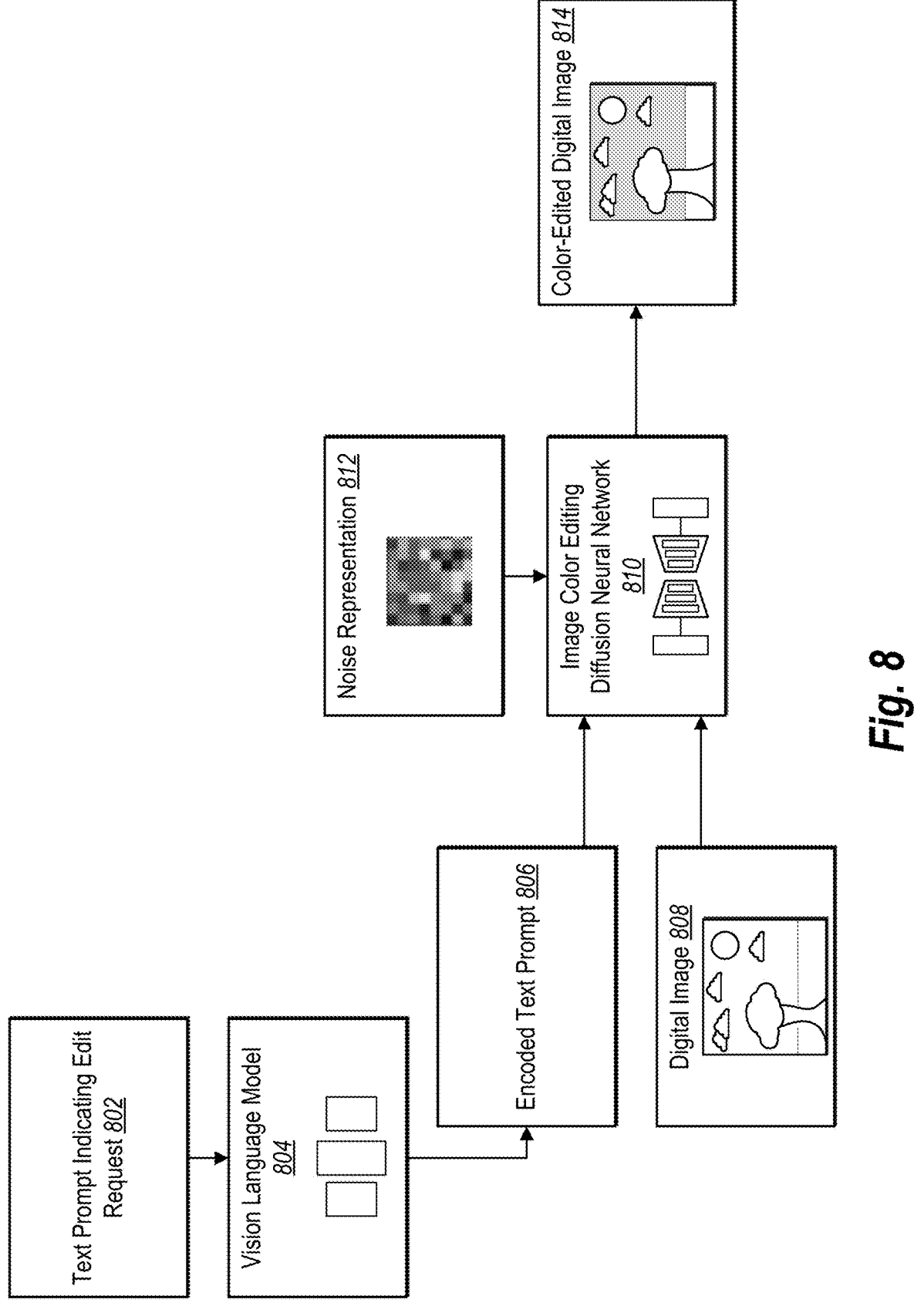
FIG. 8 illustrates a digital image color editing system performing language-guided color editing using an image color editing diffusion neural network in accordance with one or more implementations.

For example, as shown in FIG. 8, the digital image color editing system 106 receives a text prompt indicating an edit request 802 (e.g., from a client device via a text input and/or voice command). In addition, as illustrated in FIG. 8, the digital image color editing system 106 identifies (or receives) a digital image 808 for the requested color edit. Indeed, as shown in FIG. 8, the digital image color editing system 106 utilizes the text prompt indicating the edit request 802 with a vision language model 804 to generate an encoded text prompt 806. Subsequently, the digital image color editing system 106 utilizes the encoded text prompt 806, the digital image 808, and a noise representation 812 with the image color editing diffusion neural network 810 to generate a color-edited digital image 814.

For example, in one or more embodiments, the digital image color editing system 106 utilizes an image color editing diffusion neural network (as described above) to perform open-vocabulary language-guided image color editing by leveraging a vision language model-guided diffusion inference process. In some cases, the digital image color editing system 106 performs open-vocabulary language-guided image color editing with the vision language model-guided diffusion inference process without re-training or finetuning an image color editing diffusion neural network trained in accordance with one or more embodiments herein. In some cases, the digital image color editing system 106 utilizes a contrastive language-image pre-training (CLIP) model as the vision language model. Although one or more embodiments utilize a CLIP model for the language guided image color editing task, the digital image color editing system 106, in one or more instances, utilizes various vision language models, such as, but not limited to, contrastive learning models, prefix language models, masked language models, and/or image-text matching objective models.

In one or more instances, the digital image color editing system 106 utilizes a CLIP model including an image encoder $E_{img}$ and a text encoder $E_{txt}$ with an input text prompt c for language guidance in an image color diffusion neural network. In particular, the digital image color editing system 106 updates a u for each denoising step in the image color diffusion neural network with a gradient of a CLIP loss over a representation of an output color edited image of each denoising step in accordance with the following function:

$$\hat{\mu}_\theta(y_t, \varepsilon(x), t) \mid c) = \mu_\theta(y_t, \varepsilon(x), t) + s \cdot \sigma_t \nabla_{y_t} L_{CLIP}, \qquad (8)$$

$$L_{CLIP} = E_{img}(D(y_t)) \cdot E_{txt}(c)$$

In the above-mentioned function (8), the digital image color editing system 106 represents a guidance scale as s.

In one or more embodiments, the digital image color editing system 106 utilizes the above-mentioned open-vocabulary language-guided image color editing to generate language-guided edited images within a same time frame as random noise sampling image generations (e.g., without further finetuning of the image color editing diffusion neural network). Indeed, in some cases, the digital image color editing system 106 can utilize an image color editing diffusion neural network (trained in accordance with one or more embodiments herein) with the input text encoding to condition the denoising on an input image and the input text encoding representing an edit request.

As an example, the digital image color editing system 106 receives text prompts, such as, but not limited to "change color tones of the lighting," "change color styles of skin," "change colors styles of shirts." Indeed, in response to such text prompts, the digital image color editing system 106 utilizes the image color editing diffusion neural network to generate color edited digital images from input images that reflect the text prompt requests (e.g., color edited digital images with varied change in lighting color tones, color edited digital images with varied change in color styles of skin for subjects depicted in the images, color edited digital images with varied change in colors of shirts depicted on subjects in the images).

In one or more embodiments, the digital image color editing system 106 utilizes a CLIP model as described in Radford et. al., *Learning Transferable Visual Models from Natural Language Supervision*, International Conference on Machine Learning, pages 8748-8763, PMLR (2021), which is incorporated by reference herein in its entirety.

In one or more embodiments, the digital image color editing system 106 utilizes a content-awareness metric to quantitatively measure and compare the content-awareness property across multimodal generative models. Indeed, in one or more instances, the digital image color editing system 106 utilizes determining metrics based on correlations between an input image's content and output edit styles given a certain set of input noises for the input image. For example, the digital image color editing system 106 determines a diversity of generated styles given an input noise and various input images through an indication of how much the output style of a certain input noise would differ from each other when the input images are different (e.g., by assuming that random selected images are of a random distribution of their content). In one or more instances, the digital image color editing system 106 determines, for various input images and a control random noise, the digital image color editing system 106 measures a diversity of output images for a color style distribution. Additionally, in one or more instances, the digital image color editing system 106 utilizes correlations between input image content and output edit styles for a set of control input noise representations to determine a metric that measures the content awareness of a particular model via its output edit style.

In one or more instances, experimenters conducted such content awareness measurements between an implementation of an image color editing diffusion neural network (as described herein) and several conventional models to outperforms in content aware color edits through a 2 to 3 time increase in f-stat values (when comparing the content awareness metrics).

Figure 9:
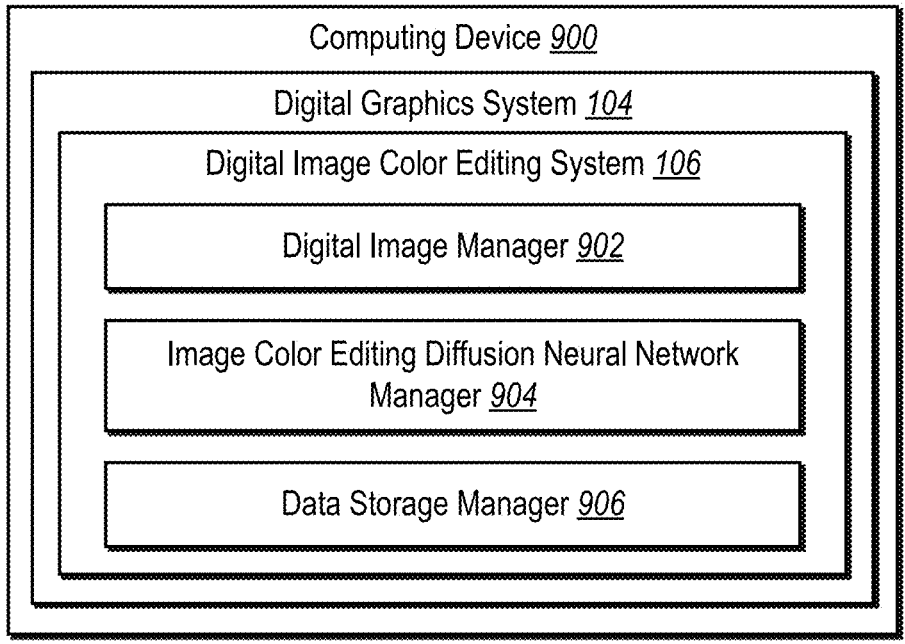
FIG. 9 illustrates a schematic diagram of a digital image color editing system in accordance with one or more implementations.

Turning now to FIG. 9, additional detail will be provided regarding components and capabilities of one or more embodiments of the digital image color editing system. In particular, FIG. 9 illustrates an example digital image color editing system 106 executed by a computing device 900 (e.g., the server device(s) 102 and client device 110). As shown by the embodiment of FIG. 9, the computing device 900 includes or hosts the digital graphics system 104 and the digital image color editing system 106. Furthermore, as shown in FIG. 9, the digital graphics system 104 includes a digital image manager 902, an image color editing diffusion neural network manager 904, and data storage manager 906.

As just mentioned, and as illustrated in the embodiment of FIG. 9, the digital image color editing system 106 includes the digital image manager 902. For example, the digital image manager 902 identifies, manages, receives, modifies, and/or displays one or more digital images, ground truth color edited digital images, and/or color edited digital images as described above (e.g., in relation to FIGS. 2-8). Furthermore, in one or more instances, the digital image manager 902 generates incomplete images (for training the image color editing diffusion neural network) as described above (e.g., in relation to FIG. 3).

Moreover, as shown in FIG. 9, the digital image color editing system 106 includes the image color editing diffusion neural network manager 904. For instance, the image color editing diffusion neural network manager 904 trains an image color editing diffusion neural network to generate color edited versions of a digital image as described above (e.g., in relation to FIGS. 2-8). In some cases, the image color editing diffusion neural network manager 904 image color editing diffusion neural network to generate color edited versions of a digital image using one or more auxiliary color space restoration tasks as described above (e.g., in relation to FIG. 4). Furthermore, in one or more embodiments, the image color editing diffusion neural network manager 904 utilizes an image color editing diffusion neural network with an input digital image to generate one or more color edited versions of the digital image as described above (e.g., in relation to FIGS. 2 and 5-8).

As further shown in FIG. 9, the digital image color editing system 106 includes the data storage manager 906. In some embodiments, the data storage manager 906 maintains data to perform one or more functions of the digital image color editing system 106. For example, the data storage manager 906 includes diffusion neural networks, image color editing diffusion neural networks, parameters for the image color editing diffusion neural networks, training dataset (ground truth color edited digital images, unedited digital images, and/or incomplete digital images), color edited digital images, noise representations, noise representations mapped to target color styles, invertible diffusion encoders, vision language models, and/or text prompts.

Each of the components 902-906 of the computing device 900 (e.g., the computing device 900 implementing the digital image color editing system 106), as shown in FIG. 9, may be in communication with one another using any suitable technology. The components 902-906 of the computing device 900 can comprise software, hardware, or both. For example, the components 902-906 can comprise one or more instructions stored on a computer-readable storage medium and executable by processor of one or more computing devices. When executed by the one or more processors, the computer-executable instructions of the digital image color editing system 106 (e.g., via the computing device 900) can cause a client device and/or server device to perform the methods described herein. Alternatively, the components 902-906 and their corresponding elements can comprise hardware, such as a special purpose processing device to perform a certain function or group of functions. Additionally, the components 902-906 can comprise a combination of computer-executable instructions and hardware.

Furthermore, the components 902-906 of the digital image color editing system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-906 may be implemented as a stand-alone application, such as a desktop or mobile application. Furthermore, the components 902-906 may be implemented as one or more web-based applications hosted on a remote server. The components 902-906 may also be implemented in a suite of mobile device applications or "apps." To illustrate, the components 902-906 may be implemented in an application, including but not limited to, ADOBE PHOTOSHOP, ADOBE PREMIERE, ADOBE LIGHTROOM, ADOBE ILLUSTRATOR, or ADOBE SUBSTANCE. "ADOBE," "ADOBE PHOTOSHOP," "ADOBE PREMIERE," "ADOBE LIGHTROOM," "ADOBE ILLUSTRATOR," or "ADOBE SUBSTANCE." The foregoing are either registered trademarks or trademarks of Adobe Inc. in the United States and/or other countries.

FIGS. 1-9, the corresponding text, and the examples provide a number of different methods, systems, devices, and non-transitory computer-readable media of the digital image color editing system 106. In addition to the foregoing, one or more embodiments can also be described in terms of flowcharts comprising acts for accomplishing a particular result, as shown in FIGS. 10 and 11. The acts shown in FIGS. 10 and 11 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIGS. 10 and 11. In some embodiments, a system can be configured to perform the acts of FIGS. 10 and 11. Alternatively, the acts of FIGS. 10 and 11 can be performed as part of a computer implemented method.

For instance, FIG. 10 illustrates a flowchart of a series of acts 1000 for generating a color edited digital image using an image color editing diffusion neural network in accordance with one or more implementations. While FIG. 10 illustrates acts according to one embodiment, alternative embodiments may omit, add to, reorder, and/or modify any of the acts shown in FIG. 10.

As shown in FIG. 10, the series of acts 1000 include an act 1002 of identifying a digital image, an act 1004 of generating a color-edited digital image from the digital image utilizing an image color editing diffusion neural network, and an act 1006 of displaying the color-edited image.

In some embodiments, the act 1002 includes identifying a digital image depicting content in a first color style, the act 1004 includes generating a denoised image representation corresponding to a second color style utilizing an image color editing diffusion neural network conditioned on the digital image and generating, utilizing image color editing diffusion neural network, a color-edited digital image depicting the content in the second color style, wherein the second color style is different from the first color style, and the act 1006 includes providing, for display within a graphical user interface, one or more color-edited digital images.

In addition, in one or more embodiments, the series of acts 1000 include identifying a noise representation corresponding to the second color style and utilizing the noise representation and the digital image with the image color editing diffusion neural network to generate the color-edited digital image. Moreover, in some instances, the series of acts 1000 include identifying an additional noise representation corresponding to a third color style and utilizing the additional noise representation and the digital image with the image color editing diffusion neural network to generate an additional color-edited digital image depicting the content in the third color style. For example, an image color editing diffusion neural network is trained to generate, from a training digital image, a denoised color-edited image conditioned utilizing a color space restoration task. In some cases, the series of acts 1000 include identifying a plurality of noise representations corresponding to a plurality of color styles and generating, utilizing the image color editing diffusion neural network with the digital image and the plurality of noise representations, color-edited digital images depicting the content of the digital image in the plurality of color styles. Additionally, in one or more implementations, the series of acts 1000 include providing, for display within the graphical user interface, the color-edited digital image and the additional color-edited digital image.

Furthermore, in one or more instances, the series of acts 1000 include identifying the noise representation corresponding to the second color style by identifying a target style digital image corresponding to the second color style and generating, utilizing an invertible diffusion encoder, the noise representation from the target style digital image. In addition, in some cases, the series of acts 1000 include identifying the noise representation corresponding to the second color style by identifying a raw digital image and an edited digital image generated from the raw digital image and generating, utilizing an invertible diffusion encoder from the raw digital image and the edited digital image, the noise representation, such that the noise representation reflects an editing direction between the raw digital image and the edited digital image.

In one or more implementations, the series of acts 1000 include receiving an input text prompt, from a client device, indicating a request to edit the digital image from the first color style to the second color style. Furthermore, in some instances, the series of acts 1000 include generating, utilizing a vision language model, an encoding of the input text prompt and generating the color-edited digital image utilizing the image color editing diffusion neural network from the digital image and the input text prompt. In some cases, the series of acts 1000 include receiving an input text prompt comprising the second color style and generating, utilizing the image color editing diffusion neural network, the color-edited digital image from the input text prompt.

Furthermore, FIG. 11 illustrates a flowchart of a series of acts 1100 for training an image color editing diffusion neural network in accordance with one or more implementations. While FIG. 11 illustrates acts according to one embodiment, alternative embodiments may omit, add to, reorder, and/or modify any of the acts shown in FIG. 11.

As shown in FIG. 11, the series of acts 1100 include an act 1102 of receiving a digital image and a ground-truth color-edited digital image, an act 1104 of generating an incomplete digital image from the digital image or the ground truth color-edited digital image, and an act 1106 of training an image color editing diffusion neural network to generate color-edited digital images utilizing the digital image, ground-truth color-edited digital image, and the incomplete digital image.

In some embodiments, the act 1102 includes receiving a training dataset comprising a digital image depicting content in a color style and a ground truth color-edited digital image depicting the content in a ground truth color style, the act 1104 includes generating an incomplete digital image from the digital image or the ground truth color-edited digital image by removing a color space channel from the digital image or the ground truth color-edited digital image, and the act 1106 includes training an image color editing diffusion neural network to generate color-edited digital images by generating, utilizing the image color editing diffusion neural network with the digital image, a denoised color-edited image representation from the ground truth color-edited digital image conditioned on the incomplete digital image.

Additionally, in one or more instances, the series of acts 1100 include generating the incomplete digital image to depict a grayscale version of the digital image or the ground truth color-edited digital image. In some cases, the series of acts 1100 include generating the incomplete digital image by removing a luminance channel from the digital image or the ground truth color-edited digital image. Moreover, in one or more implementations, the series of acts 1100 include training the image color editing diffusion neural network by generating the denoised color-edited image representation according to a color restoration task for the incomplete digital image. Furthermore, in some cases, the series of acts 1100 include training the image color editing diffusion neural network by generating the denoised color-edited image representation according to a chrominance-to-luminance completion task for the incomplete digital image.

In some cases, the series of acts 1100 include generating a measure of loss between the denoised color-edited image representation and a ground truth color-edited digital image representation and modifying parameters of the image color editing diffusion neural network based on the measure of loss. Additionally, in some instances, the series of acts 1100 include generating an additional incomplete digital image from the digital image or the ground truth color-edited digital image by removing an additional color space channel from the digital image or the ground truth color-edited digital image and generating an additional denoised color-edited image representation from the ground truth color-edited digital image conditioned on the additional incomplete digital image. Furthermore, in one or more implementations, the series of acts 1100 include generating a measure of an additional loss between the additional denoised color-edited image representation and the ground truth color-edited digital image representation and modifying the parameters of the image color editing diffusion neural network based on the measure of the additional loss.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
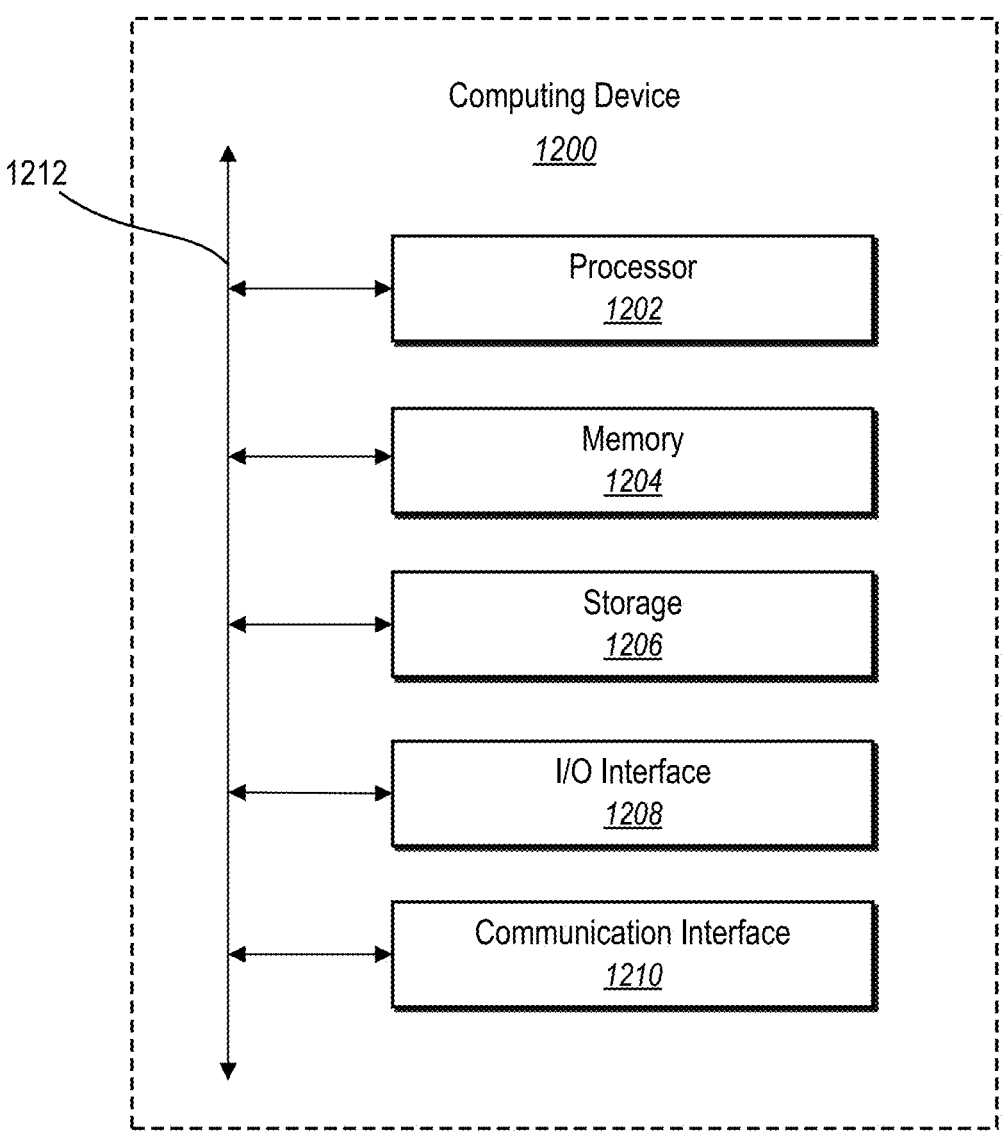
FIG. 12 illustrates a block diagram of an example computing device in accordance with one or more implementations.

FIG. 12 illustrates a block diagram of an example computing device 1200 that may be configured to perform one or more of the processes described above. One will appreciate that one or more computing devices, such as the computing device 1200 may represent the computing devices described above (e.g., the server device(s) 102 and the client device 110). In one or more implementations, the computing device 1200 may be a mobile device (e.g., a mobile telephone, a smartphone, a PDA, a tablet, a laptop, a camera, a tracker, a watch, a wearable device, etc.). In some implementations, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other implementations. Furthermore, in certain implementations, the computing device 1200 includes fewer components than those shown in FIG. 12. Components of the computing device 1200 shown in FIG. 12 will now be described in additional detail.

In particular implementations, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive ("HDD"), flash memory, a Universal Serial Bus ("USB") drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller ("NIC") or network adapter for communicating with an Ethernet or other wire-based network or a wireless NIC ("WNIC") or wireless adapter for communicating with a wireless network, such as a WI-FI. The computing device 1210 can further include a bus 1212. The bus 1212 can include hardware, software, or both that connects components of the computing device 1200 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:

identifying a digital image depicting content in a first color style;

identifying a noise representation corresponding to a second color style from an additional digital image different than the digital image;

generating a denoised image representation corresponding to the second color style utilizing an image color editing diffusion neural network to remove noise from the noise representation based on conditioning the image color editing diffusion neural network on the digital image depicting content in the first color style;

generating, utilizing the image color editing diffusion neural network, a color-edited digital image depicting the content in the second color style based on the denoised image representation, wherein the second color style is different from the first color style; and providing, for display within a graphical user interface, the color-edited digital image.

2. The method of claim 1, further comprising:

providing, to a graphical user interface, selectable options for target styles; and in response to a selection of a selectable option comprising the second color style, identifying the noise representation from the additional digital image different than the digital image.

3. The method of claim 1, further comprising:

identifying an additional noise representation corresponding to a third color style; and utilizing the additional noise representation and the digital image with the image color editing diffusion neural network to generate an additional color-edited digital image depicting the content in the third color style.

4. The method of claim 3, further comprising providing, for display within the graphical user interface, the color-edited digital image and the additional color-edited digital image.

5. The method of claim 1, wherein identifying the noise representation corresponding to the second color style comprises:

generating, utilizing an invertible diffusion encoder, the noise representation from the additional digital image.

6. The method of claim 1, wherein identifying the noise representation corresponding to the second color style comprises:

identifying a raw digital image and an edited digital image generated from the raw digital image, wherein the edited digital image is the additional digital image that is different than the digital image; and generating, utilizing an invertible diffusion encoder from the raw digital image and the edited digital image, the noise representation, wherein the noise representation reflects an editing direction between the raw digital image and the edited digital image.

7. The method of claim 1, wherein the image color editing diffusion neural network is trained to generate, from a training digital image, a denoised color-edited image conditioned utilizing a color space restoration task.

8. The method of claim 1, further comprising:

receiving an input text prompt, from a client device, indicating a request to edit the digital image from the first color style to the second color style;

generating, utilizing a vision language model, an encoding of the input text prompt; and generating the color-edited digital image utilizing the image color editing diffusion neural network from the digital image and the input text prompt.

9. A non-transitory computer-readable medium storing executable instructions which, when executed by a computing device, cause the computing device to perform operations comprising:

identifying a digital image depicting content in a first color style;

identifying a noise representation corresponding to a second color style from an additional digital image different than the digital image;

generating a denoised image representation corresponding to the second color style utilizing an image color editing diffusion neural network to remove noise from the noise representation based on conditioning the image color editing diffusion neural network on the digital image depicting content in the first color style;

generating, utilizing the image color editing diffusion neural network, a color-edited digital image depicting the content in the second color style based on the denoised image representation, wherein the second color style is different from the first color style; and providing, for display within a graphical user interface, the color-edited digital image.

10. The non-transitory computer-readable medium of claim 9, wherein the operations further comprise:

providing, to a graphical user interface, selectable options for target styles; and in response to a selection of a selectable option comprising the second color style, identifying the noise representation from the additional digital image different than the digital image.

11. The non-transitory computer-readable medium of claim 9, wherein the operations further comprise:

identifying a plurality of noise representations corresponding to a plurality of color styles; and generating, utilizing the image color editing diffusion neural network with the digital image and the plurality of noise representations, color-edited digital images depicting the content of the digital image in the plurality of color styles.

12. The non-transitory computer-readable medium of claim 9, wherein the image color editing diffusion neural network is trained to generate, from a training digital image, a denoised color-edited image conditioned utilizing a color space restoration task.

13. The non-transitory computer-readable medium of claim 9, wherein the operations further comprise:

receiving an input text prompt comprising the second color style; and generating, utilizing the image color editing diffusion neural network, the color-edited digital image from the input text prompt.

14. A system comprising:

a memory component; and one or more processing devices coupled to the memory component, the one or more processing devices to perform operations comprising:

identifying a digital image depicting content in a first color style;

identifying a noise representation corresponding to a second color style from an additional digital image different than the digital image;

generating a denoised image representation corresponding to the second color style utilizing an image color editing diffusion neural network to remove noise from the noise representation based on conditioning the image color editing diffusion neural network on the digital image depicting content in the first color style;

generating, utilizing the image color editing diffusion neural network, a color-edited digital image depicting the content in the second color style based on the denoised image representation, wherein the second color style is different from the first color style; and providing, for display within a graphical user interface, the color-edited digital image.

15. The system of claim 14, wherein the operations further comprise:

providing, to a graphical user interface, selectable options for target styles; and in response to a selection of a selectable option comprising the second color style, identifying the noise representation from the additional digital image different than the digital image.

16. The system of claim 14, wherein the operations further comprise:

identifying an additional noise representation corresponding to a third color style; and utilizing the additional noise representation and the digital image with the image color editing diffusion neural network to generate an additional color-edited digital image depicting the content in the third color style.

17. The system of claim 16, wherein the operations further comprise providing, for display within the graphical user interface, the color-edited digital image and the additional color-edited digital image.

18. The system of claim 14, wherein identifying the noise representation corresponding to the second color style comprises generating, utilizing an invertible diffusion encoder, the noise representation from the additional digital image.

19. The system of claim 14, wherein identifying the noise representation corresponding to the second color style comprises:

identifying a raw digital image and an edited digital image generated from the raw digital image, wherein the edited digital image is the additional digital image that is different than the digital image; and generating, utilizing an invertible diffusion encoder from the raw digital image and the edited digital image, the noise representation, wherein the noise representation reflects an editing direction between the raw digital image and the edited digital image.

20. The system of claim 14, wherein the image color editing diffusion neural network is trained to generate, from a training digital image, a denoised color-edited image conditioned utilizing a color space restoration task.

\* \* \* \* \*